United States Patent [19]
Bell et al.

[11] Patent Number: 5,544,603
[45] Date of Patent: Aug. 13, 1996

[54] APPARATUS FOR HANDLING FLEXIBLE OBJECTS

[75] Inventors: Cecil R. Bell, Pinnacle; Charles R. Moyer; Gregory S. Poole, both of Charlotte; Kenneth B. Silvers, Mt. Holly, all of N.C.

[73] Assignee: Monarch Knitting Machinery Corporation, Glendale, N.Y.

[21] Appl. No.: 295,984

[22] Filed: Aug. 25, 1994

Related U.S. Application Data

[63] Continuation-in-part of Ser. No. 222,801, Apr. 5, 1994.

[51] Int. Cl.⁶ .................................................... D05B 21/00
[52] U.S. Cl. ............................................... 112/475.12
[58] Field of Search ........................ 112/121.15, 262.2, 112/262.3; 198/395, 399, 468.2, 468.6; 414/755, 621; 901/35, 39; 406/52, 62, 63, 87; 223/43; 38/143

[56] References Cited

U.S. PATENT DOCUMENTS

| | | |
|---|---|---|
| Re. 30,410 | 10/1980 | Povlacs . |
| 3,429,618 | 2/1969 | Sparso et al. . |
| 3,554,354 | 1/1971 | Reid et al. . |
| 3,844,621 | 10/1974 | Tiranov et al. . |
| 4,196,681 | 4/1980 | Chietti . |
| 4,444,140 | 4/1984 | Moyer . |
| 4,538,534 | 9/1985 | Frazier et al. . |
| 4,539,924 | 9/1985 | Bell, Jr. et al. . |
| 4,564,133 | 1/1986 | Gazzarrini . |
| 4,643,340 | 2/1987 | Bailey . |
| 4,799,613 | 1/1989 | Adamson . |
| 5,040,475 | 8/1991 | Fournier et al. . |
| 5,129,337 | 7/1992 | Humphreys ..................... 112/121.15 |
| 5,165,355 | 11/1992 | Fournier et al. . |
| 5,373,977 | 12/1994 | Migliorini .................... 112/262.2 X |

*Primary Examiner*—Paul C. Lewis
*Attorney, Agent, or Firm*—Bell, Seltzer, Park & Gibson, P.A.

[57] ABSTRACT

An apparatus and method of removing a small number of flexible objects, such as circular knit hosiery blanks from a mass of randomly arranged flexible objects, depositing the flexible objects on a turntable in spaced apart relation, removing individual flexible objects from the turntable, conveying the individual flexible objects to a sensing location, sensing the orientation thereof, returning to the turntable any flexible objects that are not properly positioned for the sensing of the orientation thereof, conveying the flexible objects which have had the orientation thereof determined along one of two alternate paths of travel determined by the orientation that has been sensed and the orientation desired at the delivery point, delivering the properly oriented blanks to a transfer location, transferring the blanks to a further processing apparatus, and further processing the flexible objects.

4 Claims, 12 Drawing Sheets

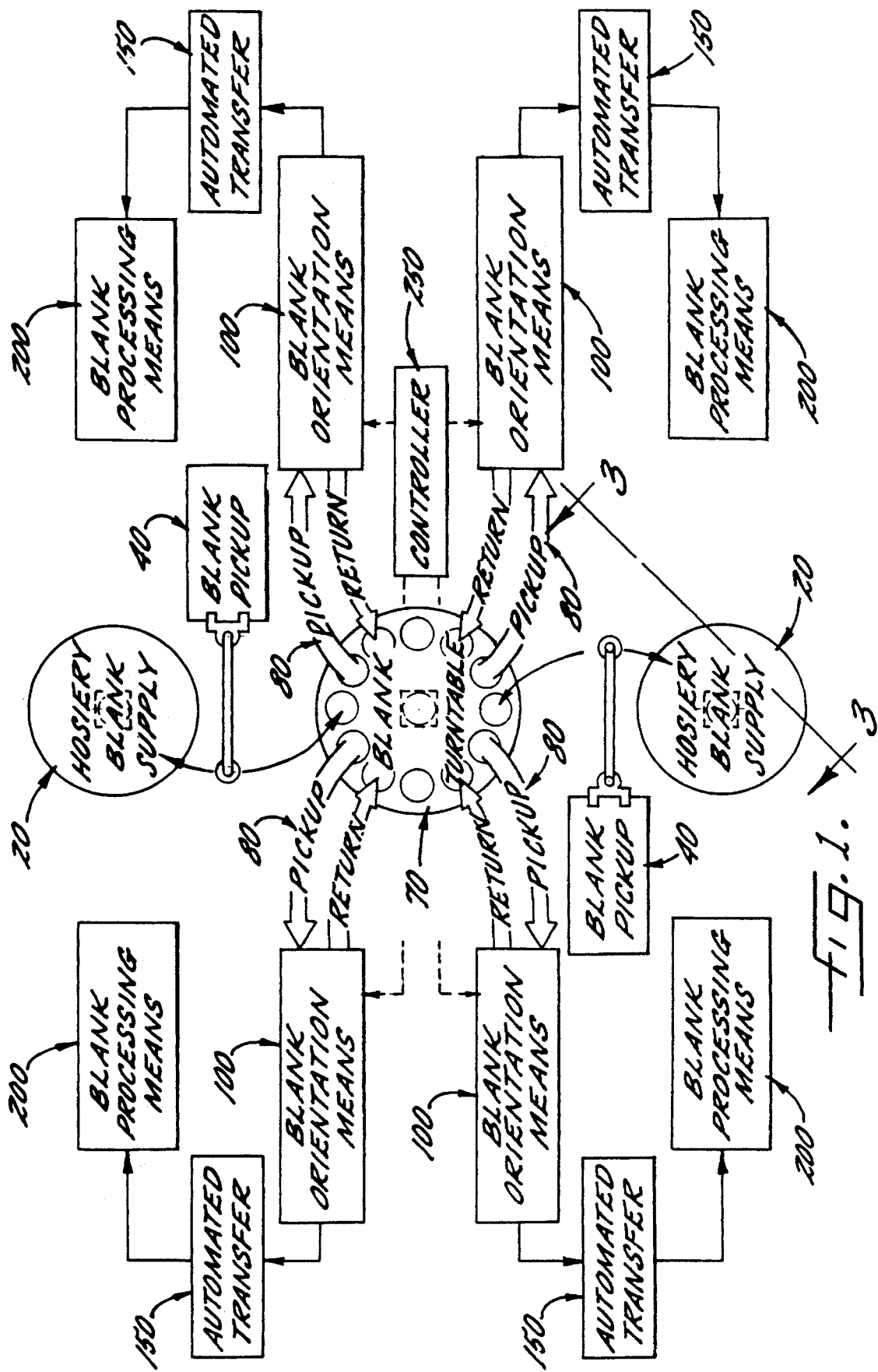

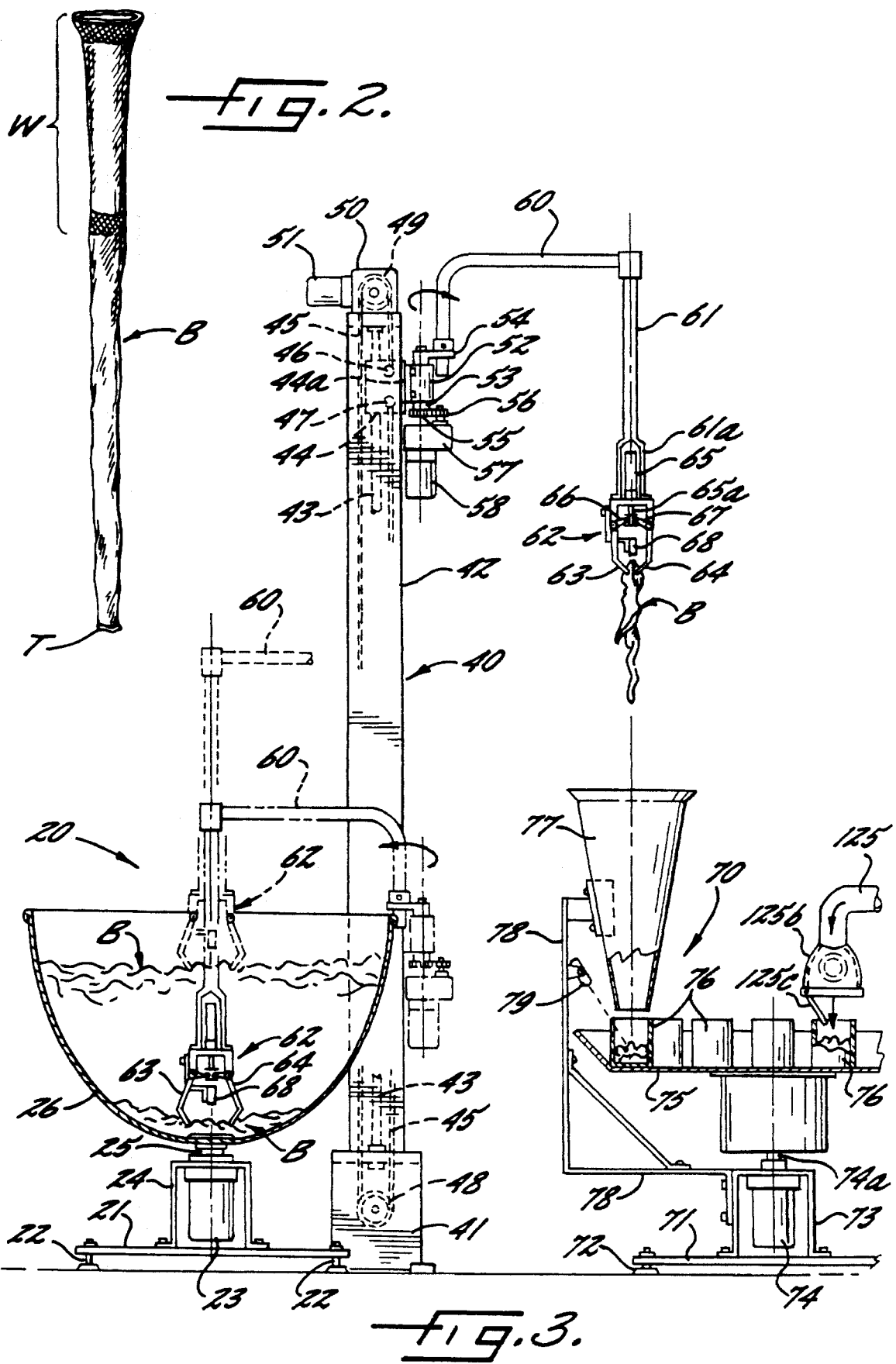

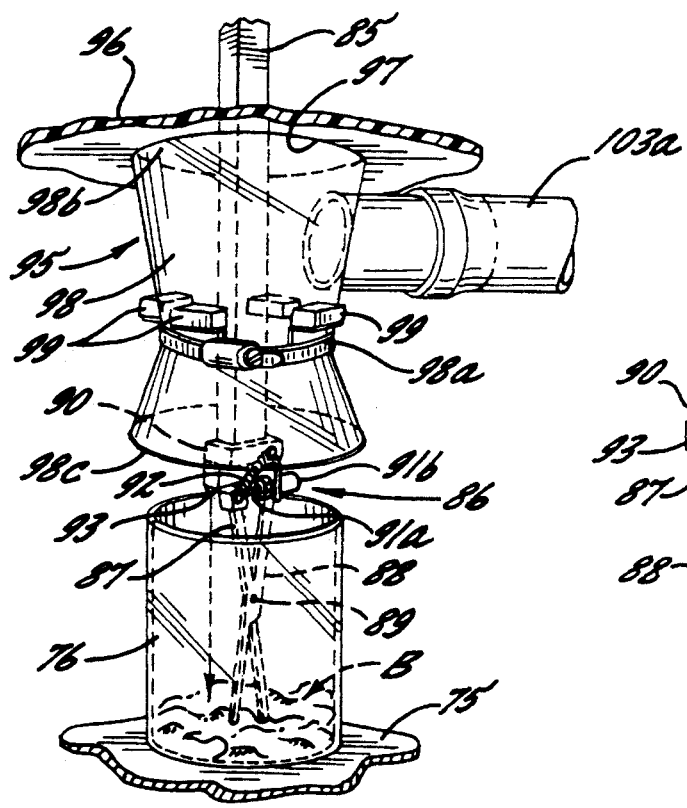
fig.5.
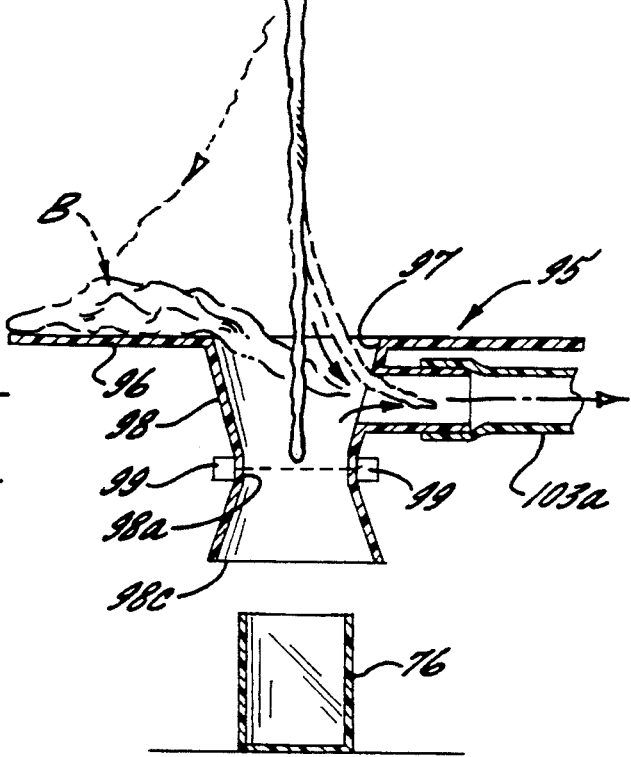
fig.6.
fig.7.

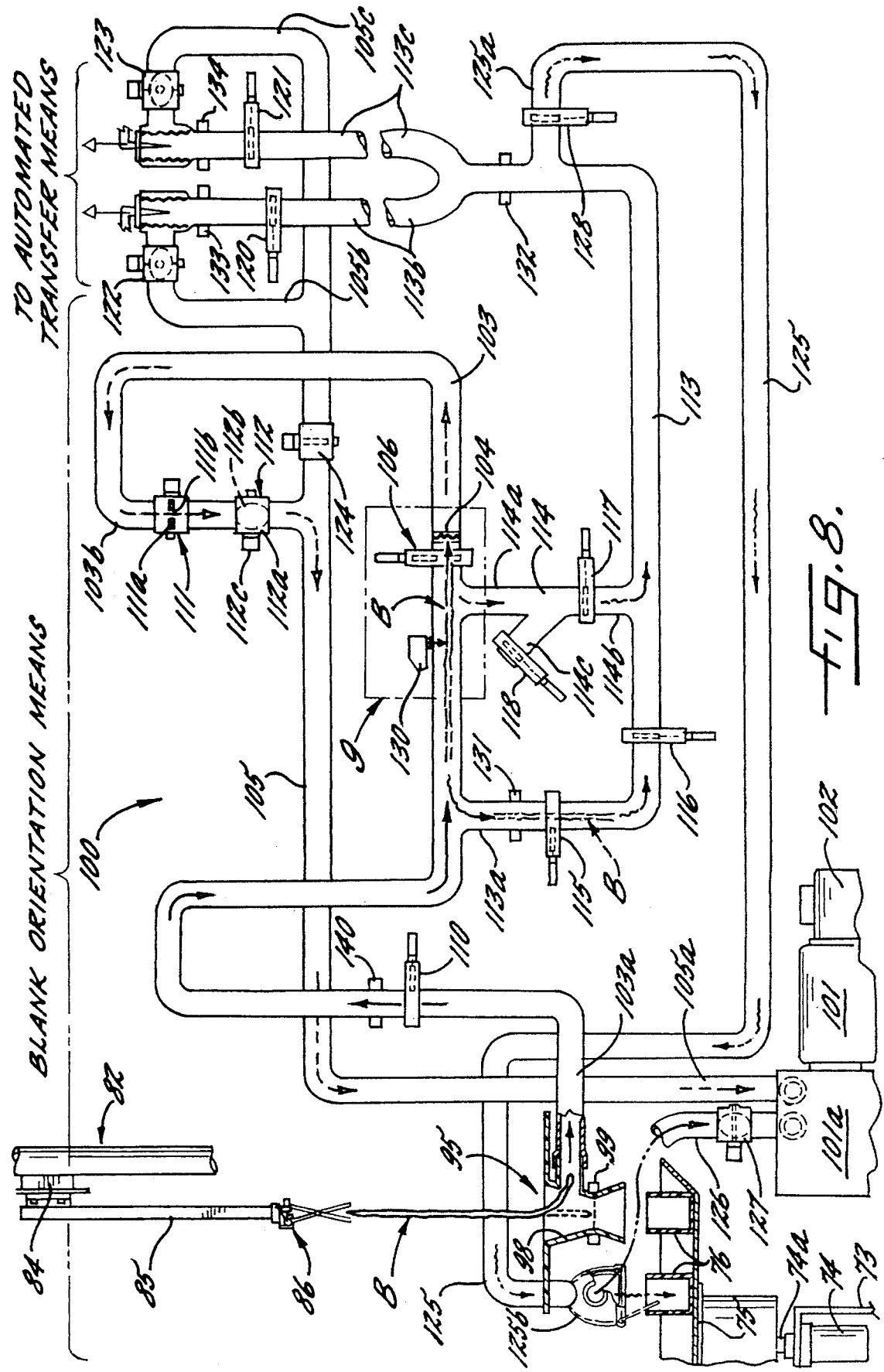

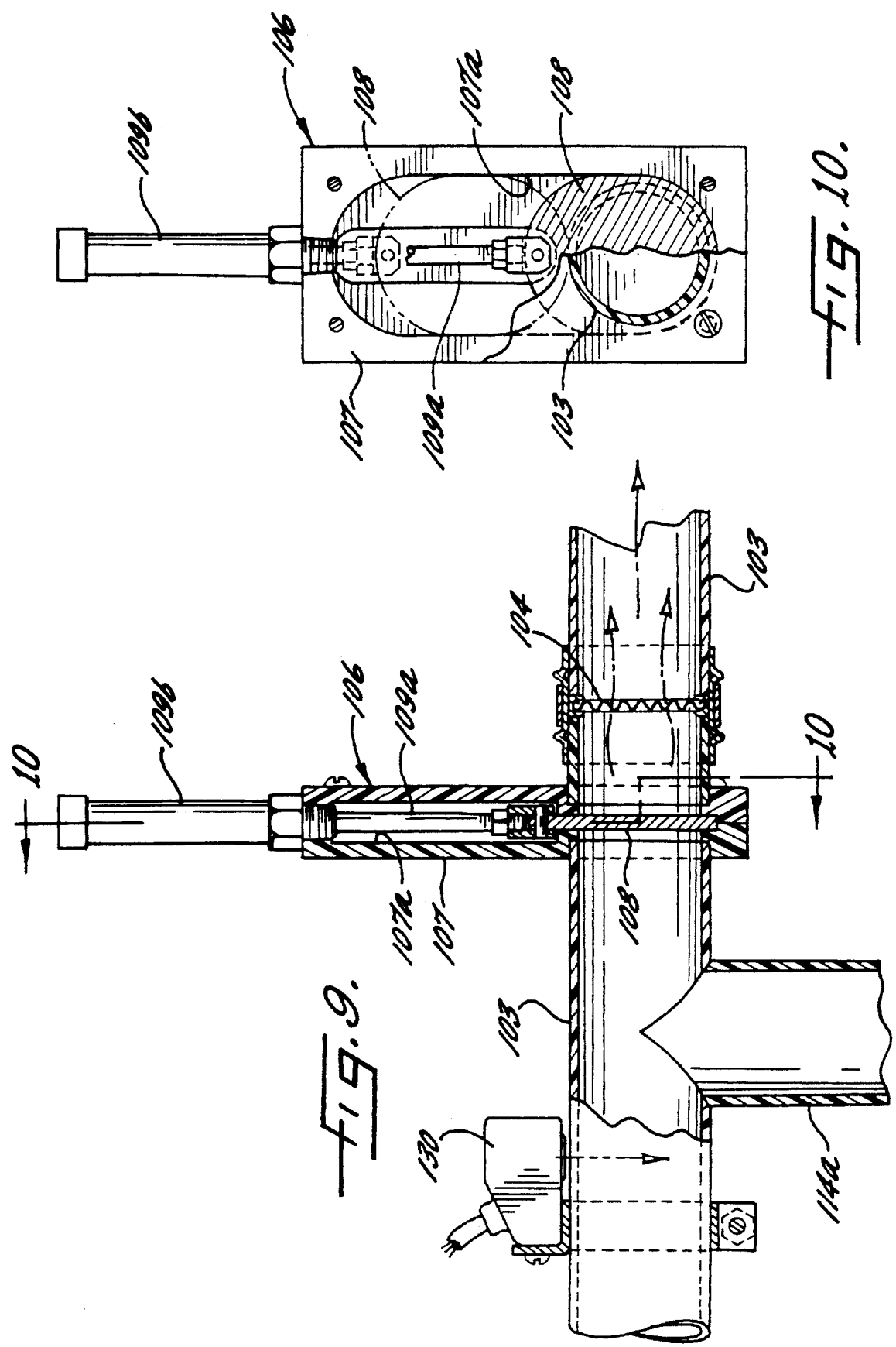

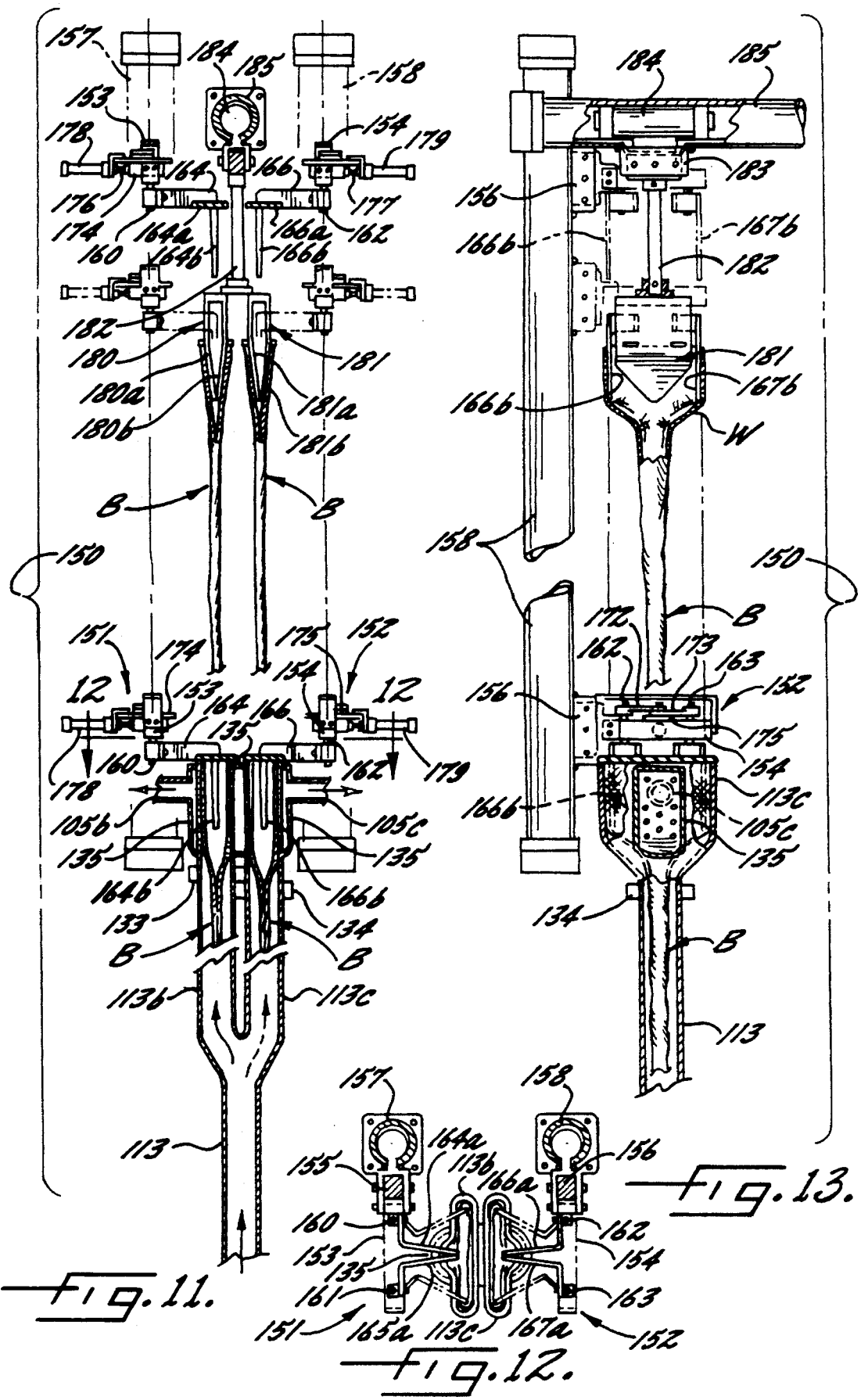

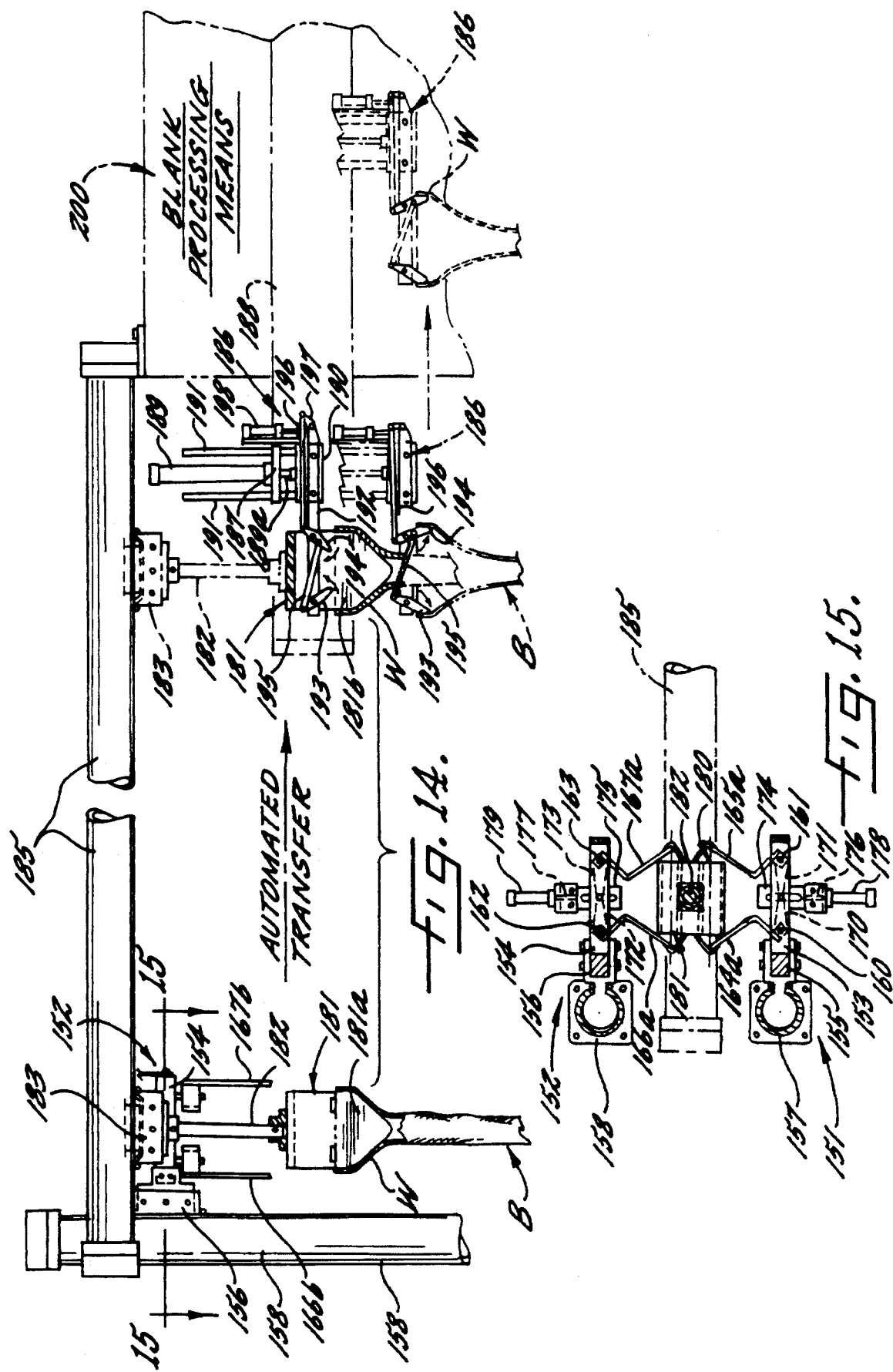

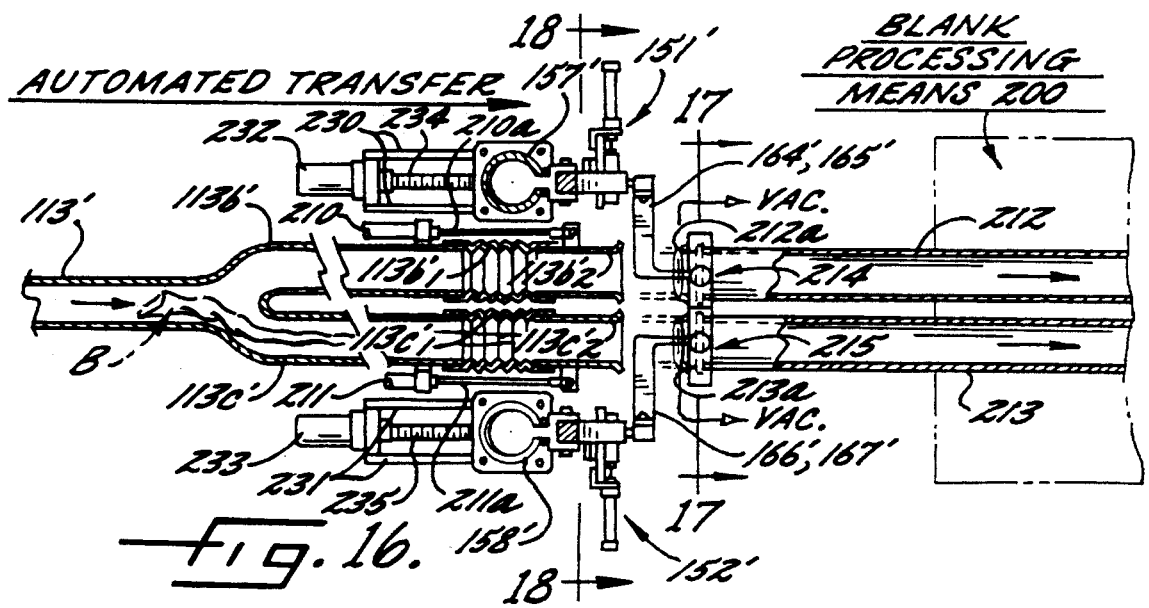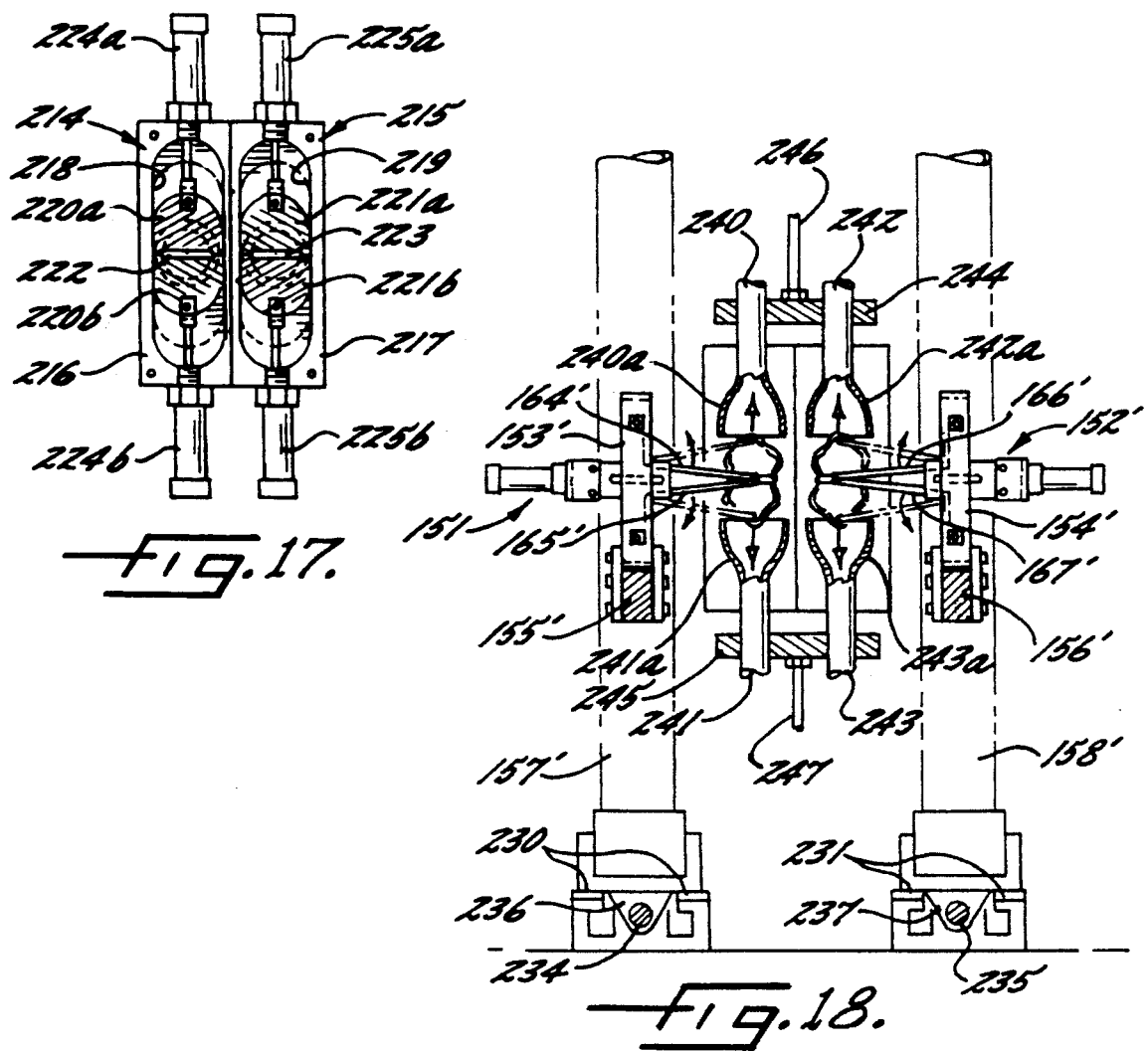

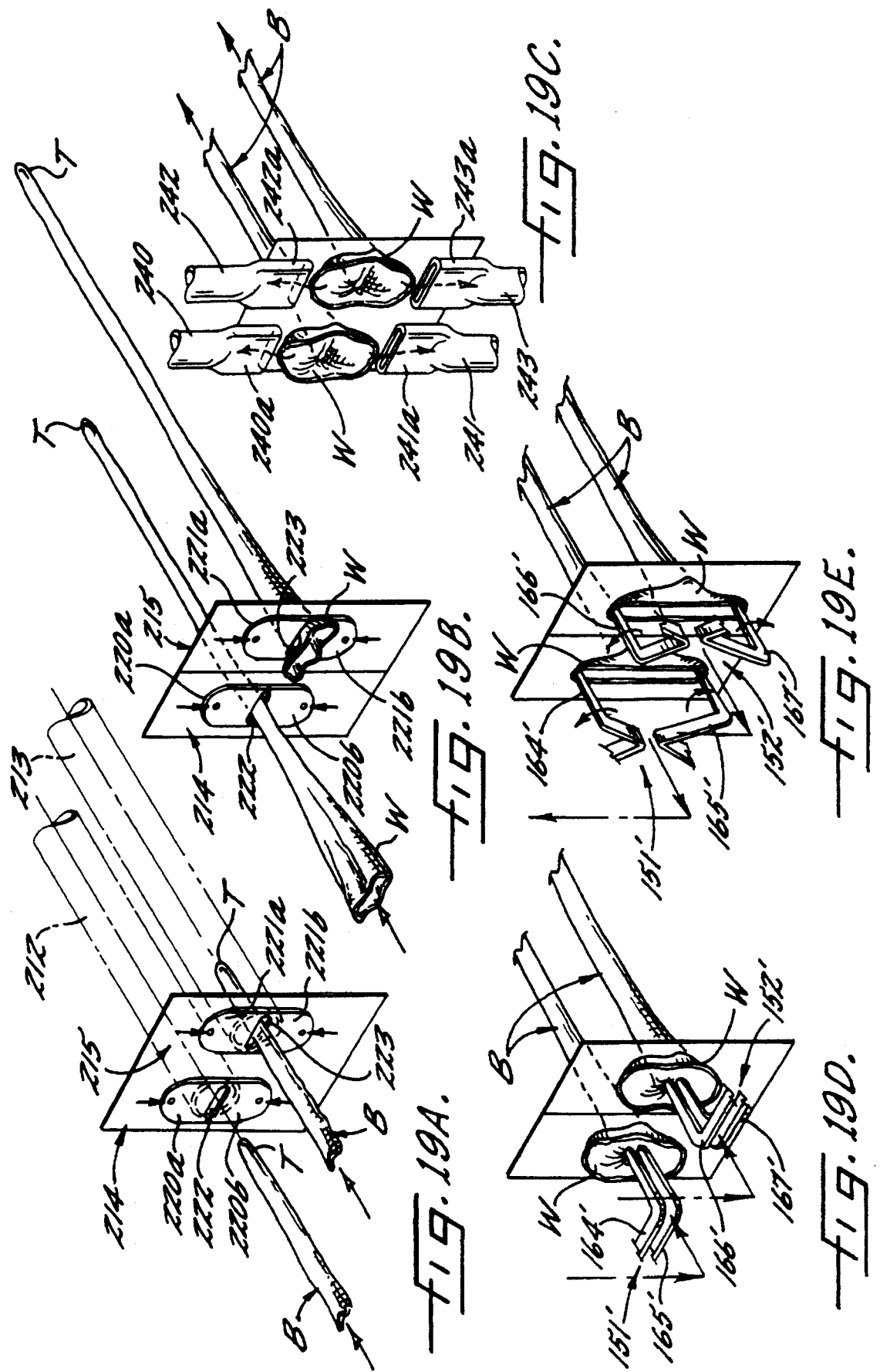

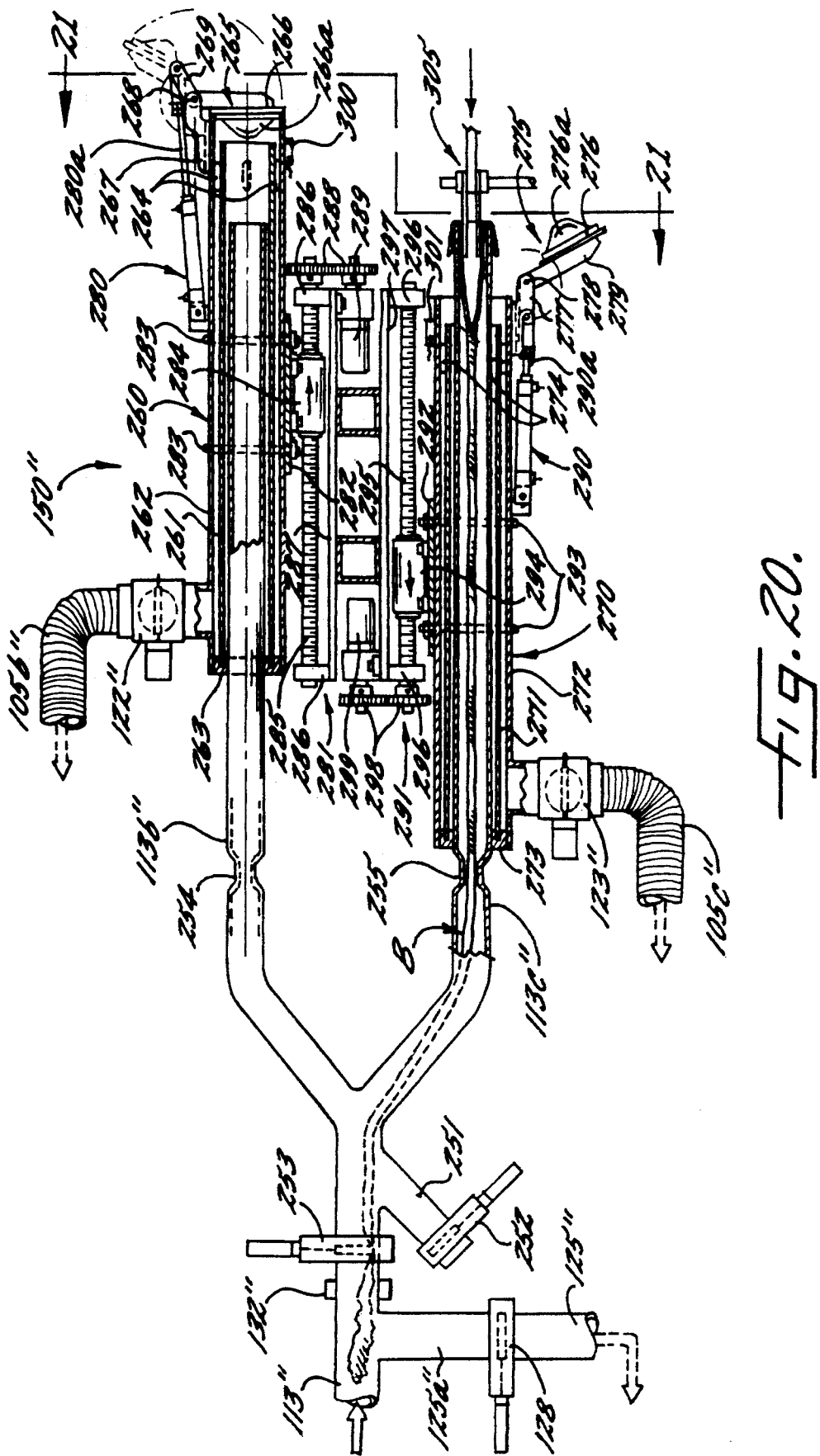

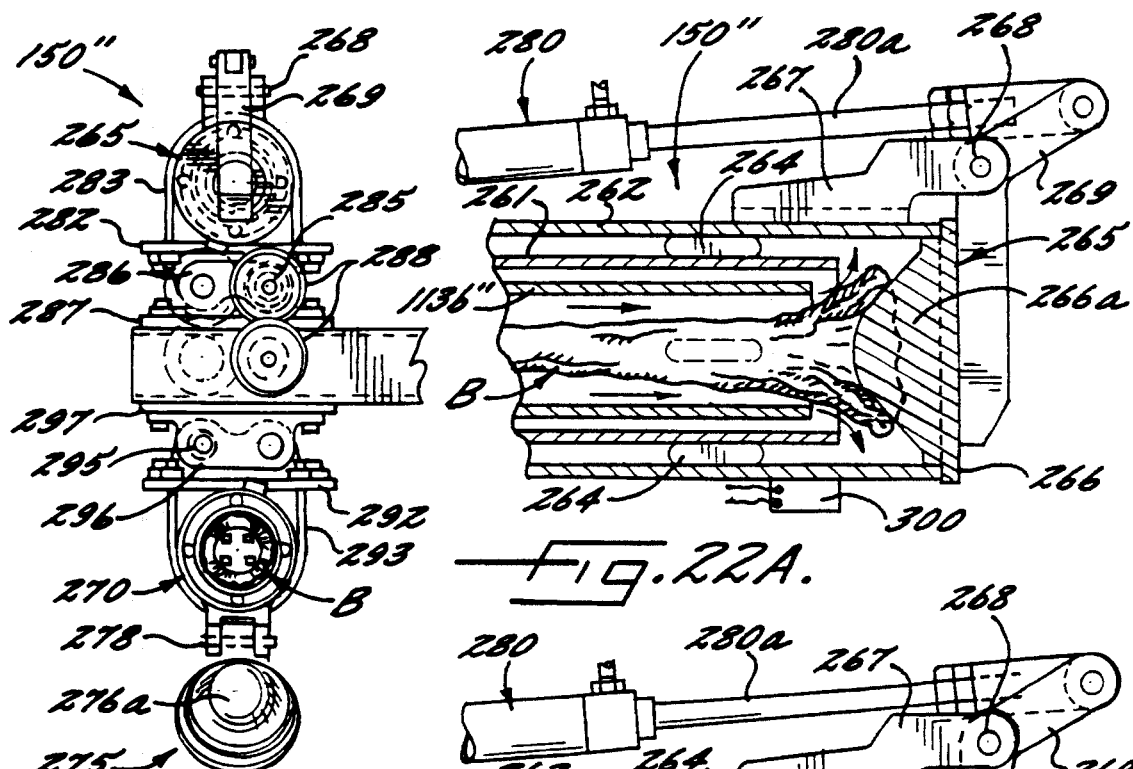
Fig. 21.
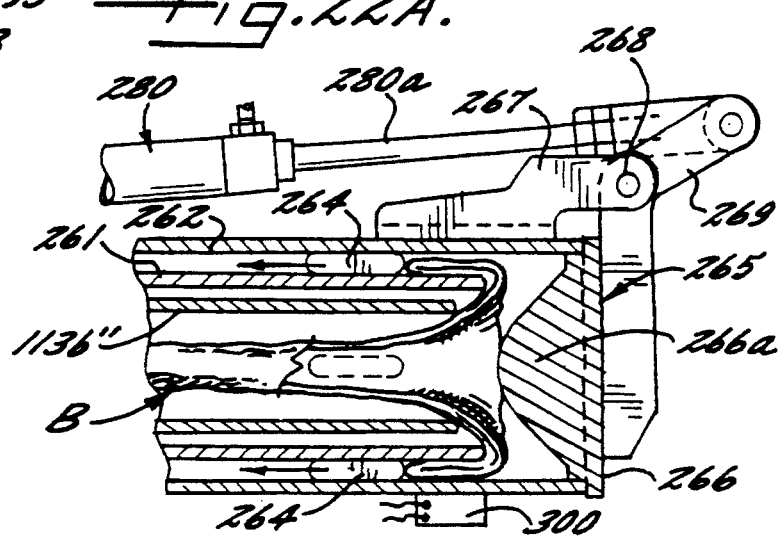
Fig. 22A.
Fig. 22B.
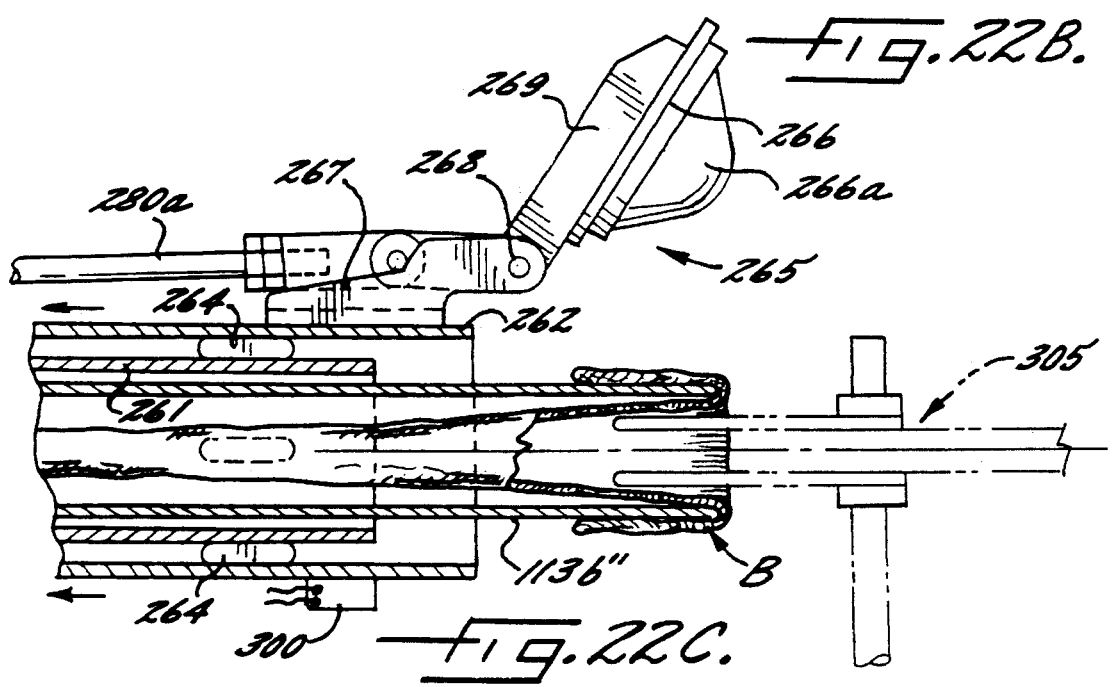
Fig. 22C.

APPARATUS FOR HANDLING FLEXIBLE OBJECTS

RELATED APPLICATION

This application is a continuation-in-part of application, Ser. No. 08/222,801, filed Apr. 5, 1994.

FIELD OF THE INVENTION

This invention relates generally to material handling systems and more particularly to an apparatus and method of handling elongate flexible objects, such as circular knit hosiery blanks.

BACKGROUND OF THE INVENTION

In the manufacture of pantyhose, circular knit hosiery blanks are knit to have toe ends and welt ends. The welt ends of two such blanks are subsequently slit and seamed together to form the panty portion of the pantyhose and the toe ends are seamed closed.

Prior to such seaming operations, various processing operations are performed on the circular knit blanks, and when the blanks are ready for combining to form pantyhose, they are delivered in a mass of randomly arranged hosiery blanks. It is necessary, therefore, to remove the individual hosiery blanks, one at a time, from the mass and to convey or transport these individual blanks to the seaming machines and to present the blanks to the seaming machines in the desired orientation, either welt end first or toe end first.

Until fairly recently, such handling and orientation of hosiery blanks were performed manually in what was a laborious, time-consuming and expensive process. There have been many attempts to automate the hosiery blank welt portion slitting and seaming operations as well as the toe portion seaming operations. Several manufacturers of such automated equipment have commercial machines on the market. Examples of such commercial machines are Takatori Corporation's Model GLC-320X Gusset Line Closer and Model LC-360 WPD Line Closer with Waist-band/ Garterline Auto Positioner for slitting and seaming the welt portions of hosiery blanks and Model TCR-2 and Model TCR-2X for closing the toes of pantyhose.

While such commercial machines have successfully automated the panty forming and toe closing operations in the manufacture of pantyhose, the handling, orientation and delivery of the properly oriented hosiery blanks to the panty forming and toe closing machines remain a problem. Several attempts at solving these problems have been made, but none have proven to be complete solutions thereto. U.S. Pat. No. 5,040,475 discloses a hosiery blank handling system which purports to provide a fully automated system for separating individual hosiery blanks from a supply of randomly arranged hosiery blanks, orienting such blanks in a predetermined orientation and delivering the oriented blanks to a panty forming or toe closing machine. While constituting a step in the right direction, this previously proposed system has several deficiencies and disadvantages.

Examples of these deficiencies and disadvantages include a double suction or vacuum pick-up means utilized in an attempt to remove individual hosiery blanks, one at a time, from the mass of hosiery blanks. The system attempts to limit the suction pickup to a single blank, but such attempts frequently may fail and multiple blanks may be removed creating problems within the system. Further, there is no provision for returning hosiery blanks that are not properly oriented back to the starting point in this prior system which may result in an improperly oriented hosiery blank being delivered or a jam-up of the system. Still further, this prior system relies on a mechanical device for determining the orientation of a particular hosiery blank in the system and such a mechanical device is subject to many variables which can adversely affect the performance of the system. In addition, this prior system has a separate pick-up and orientation system for each panty-forming or toe-closing machine.

SUMMARY OF THE INVENTION

With the foregoing in mind, it is an object of the present invention to provide a fully automated method and apparatus for handling, orienting and delivering flexible objects, such as circular knit hosiery blanks, for further processing which overcome the deficiencies and disadvantages of systems proposed heretofore.

Another object of the present invention is to provide a fully automated method and apparatus that is much less complex than prior systems and which may supply properly oriented flexible objects to multiple further processing means from a single supply source.

The objects of the present invention are achieved by a method and apparatus in which a small number of flexible objects or hosiery blanks, preferably from one to about four, are removed from the mass of flexible objects and placed on a turntable and in which another removal occurs prior to the blanks being introduced into the transporting, orienting and delivery portions of the apparatus. This is achieved through the use of two hosiery blank removing and transfer means which substantially eliminates multiple blanks being picked up and introduced into the orientation means.

Once the hosiery blank is introduced into the orientation means, the particular orientation thereof is sensed electronically and means are provided to ensure that only properly introduced and positioned blanks are permitted to proceed through the system. Improperly introduced or positioned blanks are returned to the starting point.

Once the particular orientation is determined, the blanks are conveyed along a particular one of two alternate paths of travel to a transfer location. The particular path of travel is determined by the orientation of the blank and the desired orientation thereof at the transfer location. At the transfer location, the blanks are delivered to a transfer means in the predetermined desired orientation for transfer to a further processing machine. The transfer means positions and retains the blanks in position for reception by the further processing machine.

BRIEF DESCRIPTION OF THE DRAWINGS

Some of the objects and advantages of the present invention having been stated, others will appear as the description proceeds when considered in conjunction with the accompanying schematic drawings, in which:

FIG. 1 is a schematic plan view of the method and apparatus of the present invention;

FIG. 2 is an elevational view of a hosiery blank to be handled by the method and apparatus of the present invention;

FIG. 3 is a fragmentary sectional view, taken substantially along line 3—3 in FIG. 1;

FIG. 5 is an enlarged fragmentary perspective view, partially in section, of the portion of the apparatus in the lower medial portion of FIG. 4;

FIG. 6 is a fragmentary sectional view similar to FIG. 5 illustrating the apparatus in a different operating position;

FIG. 7 is a view similar to FIG. 6 showing the apparatus in a still different operating position;

FIG. 8 is a partially schematic, partial sectional view taken of the orientation means shown in FIG. 1;

FIG. 9 is an enlarged fragmentary sectional view of the portion of the orientation means contained substantially within the box 9 in FIG. 8;

FIG. 10 is a sectional view taken substantially along line 10—10 in FIG. 9;

FIG. 11 is a fragmentary sectional view of the transfer portion shown in the upper right-hand portion of FIG. 8;

FIG. 12 is a sectional view taken substantially along line 12—12 in FIG. 11;

FIG. 13 is a fragmentary sectional view similar to FIG. 11 of another side of the transfer portion shown in FIGS. 11 and 12;

FIG. 14 is a fragmentary view, partially in section, of one embodiment of a transfer means of the present invention;

FIG. 15 is a fragmentary sectional view taken substantially along line 15—15 in FIG. 14; and FIG. 16 is a fragmentary sectional view of another embodiment of a transfer means of the present invention;

FIG. 17 is a sectional view taken substantially along line 17—17 in FIG. 16;

FIG. 18 is a sectional view taken substantially along line 18—18 in FIG. 16;

FIGS. 19A–19E are fragmentary perspective views illustrating the operation of the transfer means shown in FIG. 16;

FIG. 20 is a fragmentary view partially in section of a still further embodiment of the transfer means in accordance with the present invention;

FIG. 21 is a sectional view taken substantially along line 21—21 in FIG. 20; and FIGS. 22A, 22B and 22C are enlarged fragmentary sectional views illustrating the transfer means in different operative positions.

DETAILED DESCRIPTION OF THE PREFERRED EMBODIMENTS

Figure 4:
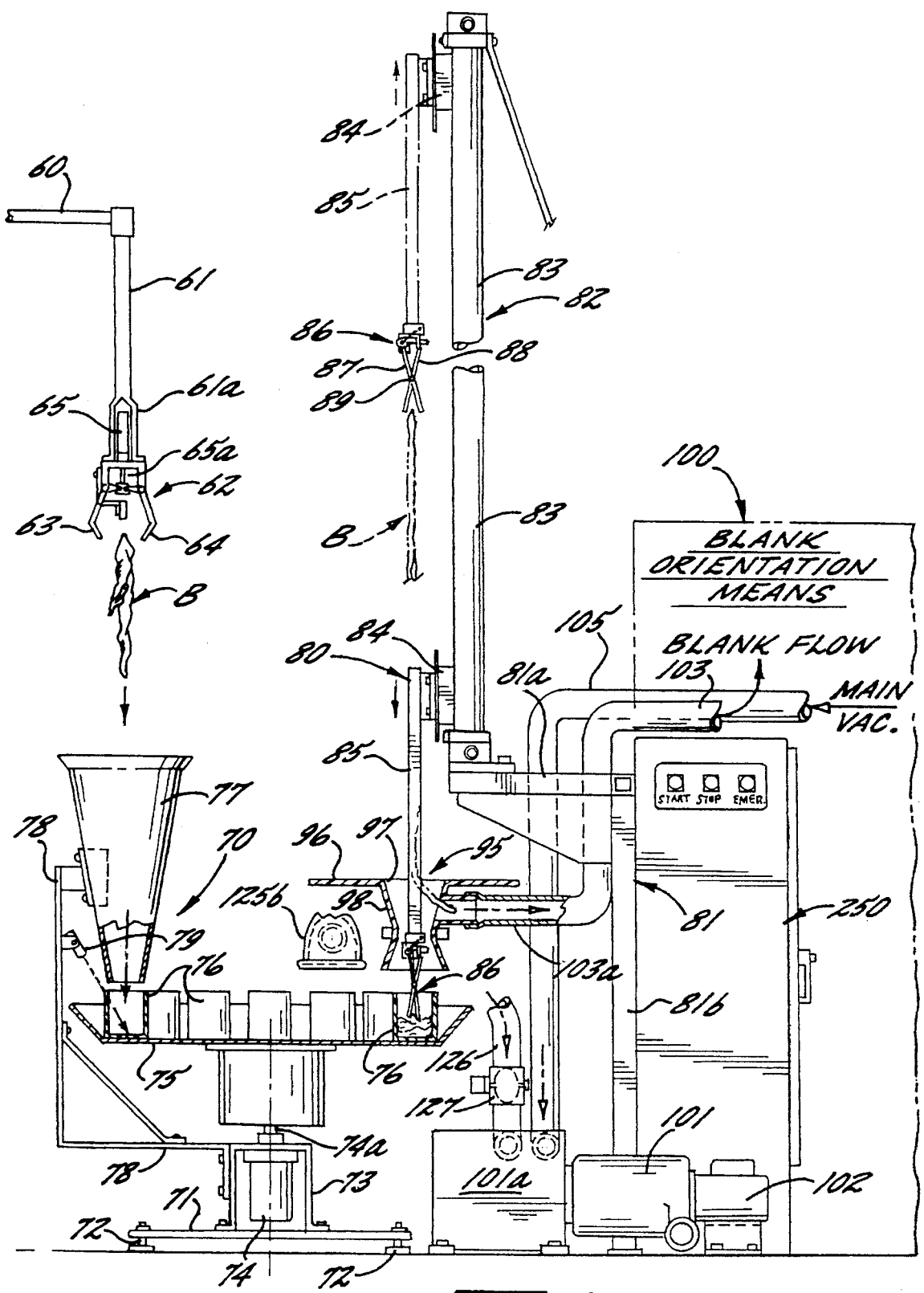
FIG. 4 is a fragmentary sectional view similar to FIG. 3 of the turntable and second blank removing and transfer means.

Referring now specifically to the drawings and particularly to FIG. 1, there is illustrated a schematic diagram of the apparatus and method of the present invention. The apparatus includes a hosiery blank supply means, generally indicated at 20, which receives and contains a mass of randomly arranged hosiery blanks. A first blank removing and transferring means, generally indicated at 40, is associated with the blank supply means 20 for removing hosiery blanks, one to about four at a time, from the supply means 20 and transferring the hosiery blanks to a first supporting means, generally indicated at 70.

Supporting means 70 receives and supports the hosiery blanks deposited by the means 40 in spaced apart relation and moves the blanks in series to a second blank removing and transferring means, generally indicated at 80. Means 80 usually picks up an individual hosiery blank from support means 70 and transfers or transports the same to an orientation means generally indicated at 100.

Orientation means 100 receives the hosiery blanks and assures that they are extended to their full length and not folded or bunched and determines the orientation of each particular blank when it is received by the orientation means 100. Any folded or bunched hosiery blanks or any multiple blanks are returned to the support means 70 for subsequent removal and re-transfer to an orientation means 100. If a hosiery blank B is fully extended, the hosiery blank is conveyed along a selected one of two alternate paths determined by the orientation of the blank and the desired orientation at the next stage.

The properly oriented hosiery blank is delivered to an automated transfer means, generally indicated at 150. Transfer means 150 transfers the hosiery blanks to a blank processing means, such as a pantyhose panty forming and/or toe closing means, generally indicated at 200.

The apparatus of the present invention may include only one hosiery blank supply means 20, a single blank removing and transfer means 40, a single second hosiery blank removing and transfer means 80, only one orientation means 100, a single automated transfer means 150 and a single blank processing means 200. However, it is preferred that a plurality of such means are used with blank support means 70. As illustrated, there are two hosiery blank supply means 20 on opposite sides of blank support means 70 and two hosiery blank removing and transfer means 40. As further illustrated, there are four second blank removing and transfer means 80, orientation means 100, automated transfer means 150 and further blank processing means 200. It should be understood that particular applications may dictate the use of more or less of these various means and that such can be done within the scope of the present invention.

Referring now to FIG. 2, there is illustrated a circular knit hosiery blank B, which has a toe end T at its lower end and a welt end W at its upper end. Welt end W is knit to be thicker than the remainder of the hosiery blank B and is adapted to be slit longitudinally along one side thereof and joined by seaming to a slit welt end of another blank to form the panty portion of a pantyhose. The toe end T is adapted to be seamed closed.

The hosiery blank supply means 20 is illustrated in FIG. 3 and includes a base 21 equipped with suitable levelers 22 to support the same on the floor of a manufacturing plant. A motor 23 is mounted on base 21 by a bracket 24 and has an output shaft 25. A hosiery blank container or tub 26 is mounted on the output shaft 25 of motor 23 for rotation therewith. Hosiery blank container 26 is preferably bowl-shaped with the sides thereof sloping downwardly and inwardly to a rounded bottom so that hosiery blanks placed therein will slide downwardly and inwardly toward the center of the bottom of the container 26.

A mass of randomly arranged hosiery blanks B is dumped into the container 26 in which they are contained and supported until removed. Preferably, the container 26 is slowly rotated substantially continuously during operation of the apparatus.

The first hosiery blank removing and transferring means 40 is illustrated in FIG. 3 and includes a base 41 supporting a vertical standard 42. Standard 42 is hollow and contains therein a vertically extending guide rod 43 mounted on the base 41 at its lower end and on the top of standard 42 at its upper end.

A slide block 44 is slidably mounted on guide rod 43 for vertical movement within standard 42. Slide block 44 has a portion 44a thereof extending outwardly through a vertical slot (not shown) in standard 42.

A sprocket chain 45 has one end thereof attached to the top of slide block 44 as indicated at 46 and the other end thereof attached to the bottom of slide block 44 as indicated at 47. Sprocket chain 45 is trained about an idler sprocket 48 at its lower end and about a drive sprocket 49 at its upper end. Drive sprocket 49 is mounted on the output shaft of a gear reduction 50 which is driven by a reversible drive motor 51. Gear reduction 50 and drive motor 51 are mounted on top of the standard 42.

A bearing block 52 is mounted on portion 44a of slide block 44 and journals for rotation therein a shaft 53 having a crank arm 54 mounted on the upper end thereof. A driven gear 55 is mounted on the lower end of shaft 53 and meshes with a drive gear 56 mounted on the output shaft of a gear reduction 57. Gear reduction 57 is driven by a reversible motor 58 such that shaft 53 and crank arm 54 are rotated through an arc of less than 360°, preferably between about 90° and about 180°.

An inverted L-shaped mounting arm 60 is mounted on crank arm 54 for movement therewith and a vertical mounting member 61 is suspended from the outer end thereof. The lower end of mounting member 61 is bifurcated as indicated at 61a. The bifurcated end portion 61a mounts a clamping means 62 which includes a pair of opposed pivotally mounted fingers 63, 64. Clamping fingers 63, 64 are pivoted toward and away from each other between clamped and unclamped (released) positions by a pneumatic cylinder 65, the piston rod 65a of which is connected to fingers 63, 64 by actuating members 66, 67.

A sensing means 68 is mounted on clamping means 62 for sensing the relative position between clamping means 62 and a hosiery blank B or a mass of such blanks. Preferably, sensing means 68 is a photocell and is disposed between the clamping fingers 63, 64.

Clamping means 62 releases or deposits the hosiery blanks B on the hosiery blank supporting means 70. Supporting means 70 includes a base 71 supported by levelers 72. A bracket 73 is mounted on base 71 and supports a drive motor 74 having an output shaft 74a. Shaft 74a supports a turntable 75 for rotation therewith. Turntable 75 has a plurality of open-topped compartments 76 mounted thereon in spaced apart relation. Each compartment 76 is adapted to receive a hosiery blank B therein.

A funnel 77 is carried by a bracket 78 which in turn is mounted on bracket 73. Funnel 77 is positioned beneath the release position of clamping means 62 and is adapted to receive hosiery blanks therefrom. The open bottom of funnel 77 is immediately above the open top of a compartment 76 on turntable 75. Thus, hosiery blanks B released from clamping means 62 will fall into funnel 77 and pass therethrough into one of the compartments 76.

A sensing means 79, preferably a photocell, is carried by bracket 78 in position to sense the presence of a hosiery blank or blanks B in the compartment 76 beneath the funnel 77. The turntable 75 is indexed by motor 74 a distance corresponding to the spacing between compartments 76 as the hosiery blank removing and transferring means 40 goes through one removal and transfer cycle. If a hosiery blank B is not present in the compartment 76 in position to be removed by second removing means 80, the turntable 75 preferably will be held in place beneath the funnel 77 until a hosiery blank or blanks are in proper position for further removal.

The turntable 75 indexes from the hosiery blank receiving position to a hosiery blank delivery position beneath the second hosiery blank removing and transferring means 80 (FIGS. 4 and 5). Means 80 includes a frame 81 having a horizontal bed 81a and supporting legs 81b. An actuating means 82 is carried by bed 81a and extends upwardly therefrom. Actuating means 82 preferably includes a rodless cylinder 83 having a slide 84 movable with the piston (not shown).

Slide 84 carries a mounting member 85 which mounts a second clamping and unclamping means 86 at its lower end. Clamping means 86 is preferably in the form of a scissor-like clamping device having two clamping members 87, 88 pivotally connected intermediate their ends as indicated at 89. The upper end of scissor member 88 is fixed to a mounting bracket 90 connected to the lower end of mounting member 85. The upper end of scissor member 87 is connected to a piston rod 91a of a small cylinder 91b connected to a source of compressed air in a manner not shown. A retraction spring 92 is also connected to the upper end of scissor member 87 to bias the scissor members 87 and 88 toward the clamped position.

A sensing means 93 in the form of a photocell is carried by the clamping means 86 to sense the presence and position of a hosiery blank or blanks B in the compartment 76 indexed to a position directly beneath the clamping means 86. Sensing means 93 controls the lowermost position of clamping means 86 and the operation of the clamping means. Because of the sensing means 93 and the construction of the clamping means 86, the clamping means 86 will clamp and pick-up only one hosiery blank, even if more than one blank is in the compartment 76, in virtually all instances.

The hosiery blank removing and transfer means 80 also includes a hosiery blank transfer means 95 which includes a hosiery blank supporting table 96 having a hole 97 centrally disposed therein and a transfer member 98. Transfer member 98 is of reduced diameter in a medial portion 98a thereof and flares outwardly from this medial portion 98a to the upper end 98b and to the lower end 98c thereof. Upper end 98b of transfer member 98 is secured to support table 96 and communicates with the hole 97 therein.

The clamping means 86 is moved downwardly and upwardly through the hole 97 in support table 96 and through the transfer member 98 into and out of the compartment 76 to clamp and remove a hosiery blank B from compartment 76 and to raise the hosiery blank B upwardly into and partially through the transfer member 98.

A plurality of sensing means 99, preferably photocells, are mounted around the medial portion 98a of the transfer member 98 (FIG. 5). Sensing means 99 senses the presence of a hosiery blank B and particularly the trailing end thereof when it passes the sensing means 99. At that time, the sensing means 99 would signal that condition to the controller means 250.

The second hosiery blank removing and transfer means 80 delivers the hosiery blanks B to the hosiery blank orientation means 100. Orientation means 100 preferably is a suction or vacuum system in which a vacuum fan 101 is driven by a motor 102 to create a suction force or vacuum in a plenum 101a, which is part of the orientation means 100.

A first blank conveying tube 103 is connected at one end 103a to the transfer member 98 for receipt of hosiery blanks therefrom (FIG. 8). The conveying tube 103 has a hosiery blank stop means 104 in the form of a screen extending thereacross (FIG. 9). The other end 103b of first conveying tube 103 is connected to a suction tube 105 which is connected at one end 105a to the plenum 101a and thereby to the vacuum fan 101.

First conveying tube 103 has a first gate valve 106 mounted therein at a location closely adjacent the hosiery blank stop means 104 on the upstream side thereof. First gate valve 106 includes a housing 107 having an internal cavity 107a therein to which opposed end portions of two sections of conveying tube 103 are communicatively connected (FIGS. 8 and 9). Valve 106 includes a gate 108 that is slidably mounted in cavity 107a between open and closed positions. Gate 108 is connected to the outer end of a piston rod 109a of a double acting cylinder 109b which moves the gate 108 between its open and closed positions. Cylinder 109b is connected to a source of compressed air (not shown).

Tube 103 has a second gate valve 110 therein between first gate valve 106 and the hosiery transfer member 98 and spaced from gate valve 106 a distance greater than the length of a hosiery blank B. Gate valve 110 is of substantially the same construction as gate valve 106 and operates in substantially the same manner. Accordingly, gate valve 110 will not be further described herein.

End portion 103b of first conveying tube 103 has a flapper or butterfly valve 111 mounted therein. Valve 111 has a flapper closure member 111a therein which has a small hole 111b therethrough to permit the vacuum fan 101 to pull a reduced vacuum on tube 103 when flapper valve 111 is closed. A second flapper or butterfly valve 112 is mounted in end portion 103b of tube 103 between valve 111 and the suction tube 105. Valve 112 includes a housing 112a and a flapper closure member 112b in the housing 112a that is operated by a pneumatic valve actuating means 112c.

A first delivery conveying tube 113 is connected at one end 113a to tube 103 between gate valves 106 and 110 and at a location along tube 103 spaced from hosiery blank stop means 104 a distance less than the fully extended length of a hosiery blank B. The other end portion of delivery conveying tube 113 is bifurcated into two end portions 113b and 113c, both of which are connected to automated transfer means 150. Suction tube 105 has the end thereof opposite the vacuum pump 101 bifurcated into end portions 105b and 105c which are respectively connected to end portions 113b and 113c of delivery conveying tube 113 so that a vacuum may be drawn on tube 113 by vacuum fan 101.

A second delivery conveying tube 114 is connected at one end 114a to tube 103 at a location upstream of but adjacent to gate valve 106 and at its other end 114b to first delivery conveying tube 113 at a medial location thereof. Tube 114 has a branch portion 114c which communicates with the atmosphere for introduction of air into the tube 114 for reasons to be hereafter explained.

A third gate valve 115 is mounted in end portion 113a of first delivery conveying tube 113 at a location spaced from tube 103 and gate valve 106 therein a distance less than the full length of a hosiery blank B. A fourth gate valve 116 is mounted in delivery tube 113 at a location between gate valve 115 and second delivery tube 114.

A fifth gate valve 117 is mounted in second delivery tube 114 between the branch portion 114c and the end portion 114b thereof. A sixth gate valve 118 is mounted in the branch portion 114c.

Seventh and eighth gate valves 120, 121 are respectively mounted in end portions 113b and 113c of delivery tube 113 in spaced relation to the automated transfer means 150. Third and fourth flapper or butterfly valves 122, 123 are respectively mounted in end portions 105b and 105c of suction tube 105 adjacent the end portions 113b and 113c of delivery tube 113. Third and fourth flapper valves 122, 123 are substantially the same as first flapper valve 111. A fifth flapper or butterfly valve 124 is mounted in suction tube 105 between tube 103 and the bifurcated end portions 105b and 105c.

A hosiery blank return tube 125 is connected at one end 125a to delivery tube 113 at a location spaced upstream from the bifurcated end portions 113b and 113c. Return tube 125 terminates at its other end in a bell-shaped portion 125b. End portion 125b is connected to plenum 101 and thereby to vacuum pump 101 by a second suction tube 126 having a sixth flapper valve 127 mounted therein. Bell-shaped end portion 125b includes a pivotally mounted bottom 125c (FIGS. 3 and 8). Bottom 125b normally closes the end portion 125b of return tube 125 but is movable by the weight of a returned hosiery blank to an open position to dump the returned hosiery blank into a compartment 76 on turntable 75.

A ninth gate valve 128 is mounted in the end portion 125a of return tube 125. Gate valve 128 is normally closed but is opened when a hosiery blank is to be returned.

A hosiery blank characteristic sensing means 130 is mounted adjacent conveying tube 103 in predetermined spaced relation to gate valve 106. Sensing means 130 is a thickness or opacity sensing photocell which is capable of sensing or detecting the different thickness or opacity of the welt portion of a hosiery blank versus the toe portion thereof. One example of a photocell which may be used is an analog output type photoelectric switch, Type E3SA, manufactured by Omron Corporation.

A first hosiery blank sensing means 131 is mounted around first delivery tube 113 between tube 103 and the gate valve 115 for sensing the presence of a hosiery blank B in end portion 113a of tube 113. A second hosiery blank sensing means 132 is mounted around delivery tube 113 between return tube 125 and the bifurcated end portions 113b and 113c. Third and fourth hosiery blank sensing means 133 and 134 are respectively mounted around end portions 113b and 113c between gate valves 120, 121 and the suction tube end portions 105b and 105c. A fifth hosiery blank sensing means 140 is mounted around tube 103 just downstream of second gate valve 110 to sense the passage of a hosiery blank thereby.

Preferably, the outer end portions of the bifurcated end portions 113b and 113c of delivery tube 113 are flattened into an elongated oval shape, as best illustrated in FIG. 12. The elongated oval shape permits the automated transfer means 150 to spread laterally the welt portions W of the hosiery blanks B. In this regard, the bifurcated end portions 105b and 105c of suction tube 105 are preferably connected to delivery tube end portions 113b and 113c by a plenum 135 which surrounds the oval ends thereof and communicates therewith through perforations in the oval end portions thereof. The vacuum applied to these oval end portions separate the sides of the welt portions of the hosiery blanks to facilitate transfer thereof by the transfer means 150.

The transfer means 150 is illustrated in the form of one embodiment in FIGS. 11–15. As illustrated therein, transfer means 150 includes a pair of hosiery blank grasping and transporting means 151 and 152. Means 151 operates in conjunction with delivery tube end portion 113b and means 152 operates in conjunction with delivery tube end portion 113c.

Means 151 and 152 include carriages 153, 154 that are carried by and movable with the slides 155, 156 of rodless cylinders 157, 158. The carriages 153, 154 are thereby moved vertically from a lower, blank pick-up position at delivery tube end portions 113b, 113c and an upper position where the hosiery blanks B have cleared the delivery tube end portions 113b and 113c.

Carriages 153, 154 have a pair of shafts 160, 161 and 162, 163 mounted for rotation therein. The lower ends of shafts 160, 161 and 162, 163 have welt portion engaging finger members 164, 165 and 166, 167 mounted thereon for partial rotary movement therewith. Finger members 164, 165 and 166, 167 are of a double L-shape and have generally L-shaped horizontal portions 164a, 165a and 166a, 167a, respectively, and depending vertical portions 164b, 165b and 166b, 167b. Depending vertical portions 164b, 165b and 166b, 167b are adapted to enter the welt portions of the hosiery blanks and to engage and further spread those welt portions upon rotary movement thereof with shafts 160, 161 and 162, 163.

Shafts 160, 161 and 162, 163 have the outer ends of crank arms 170, 171 and 172, 173 mounted thereon for imparting rotary movement to the shafts upon pivotal movement of the crank arms. The inner ends of the crank arms 170, 171 and 172, 173 are connected to spiders 174, 175 by pivot pins (FIG. 13). Spiders 174, 175 are carried by the outer ends of piston rods 176, 177 of double-acting cylinders 178, 179. Cylinders 178, 179 are connected to a source of compressed air in a manner not shown.

Once finger members 164, 165 and 166, 167 are positioned within oval end portions 113b and 113c of delivery tube 113, the cylinders 178, 179 are actuated to pivot crank arms 170, 171 and 172, 173 to move the depending vertical portions 164b, 165b and 166b, 167b away from each other to spread the welt portions of two hosiery blanks. The rodless cylinders 157, 158 are activated to raise the carriages 153, 154 upwardly toward the upper position.

A pair of hosiery blank transfer members 180, 181 are disposed above the carriages 153, 154 in position to receive the welt portions of the pair of hosiery blanks thereon (FIGS. 11 and 13). Transfer members 180, 181 include respective pairs of side-by-side members 180a, 180b and 181a, 181b, which have the lower ends thereof tapered in both directions to more readily enter the spread welt portions.

The transfer members 180, 181 are carried by the lower end of a suspension rod 182 which in turn is mounted on a slide block 183 connected to the piston 184 in a rodless cylinder 185 (FIG. 13).

As the carriages 153, 154 move upwardly, the horizontal portions of finger members 164, 165 and 166, 167 move on opposite sides of transfer members 180, 181 and raise the hosiery blanks upwardly so that the lower portions of transfer members 180, 181 enter the spread welt portions. The welt portions will be raised by finger members 164, 165 and 166, 167 until stops on the transfer members 180, 181 are engaged. Further upwardly movement of carriages 153, 154 will remove finger members 164, 165 and 166, 167 from the welt portions of the hosiery blanks, leaving the hosiery blanks suspended on transfer members 180, 181 (FIG. 14).

Cylinder 185 then moves transfer members 180, 181 from the hosiery blank donning position to the blank doffing position (FIG. 14). Hosiery blank doffing means 186 is provided for removing the hosiery blanks from the transfer members 180, 181 and delivering the blanks for further processing in the blank processing means 200.

Doffing means 186 includes a carriage 187 mounted on the piston (not shown) of a rodless cylinder 188. Carriage 187 mounts a cylinder 189, the piston rod 189a of which carries a slide block 190 that has a pair of guide rods 191 that are disposed in openings through carriage 187. Slide block 190 carries a pair of mounting members 192 (only one of which is shown) which extends horizontally, outwardly therefrom and is moved by carriage 187 and cylinder 188 between the transfer member portions 180a, 180b and 181a, 181b. Mounting members 192 have pivotally mounted fingers 193, 194 thereon, which fingers are connected together for movement in unison by a connecting link 195.

Actuating means for finger 193, 194 includes connecting member 196 connected to finger 194, an L-shaped crank arm 197 connected to member 196 and pivotally mounted on slide block 190 and a double-acting cylinder 198 connected to crank arm 197 for actuating fingers 193, 194.

Referring now to the embodiment of the automated transfer means 150 illustrated in the FIGS. 16–19E, like reference characters with the prime notation added will be used to designate similar elements. In this embodiment, the hosiery blank delivery tube 113' has bifurcated end portions 113b', 113c' that are provided with extendable sections 113b'$_1$, 113c'$_1$. Also, instead of flattened oval ends, the end portions 113b', 113c' have round, flared ends 113b'$_2$, 113c'$_2$ (FIG. 16). The ends 113b'$_2$, 113c'$_2$ are extendable and retractable longitudinally of the end portions 113b', 113c'. Double-acting cylinders 210, 211 have the piston rods 210a, 211a thereof connected to ends 113b'$_2$, 113c'$_2$, respectively, to provide this extension and retraction.

First and second transfer tubes 212, 213 are mounted in axial alignment to but spaced from ends 113b'$_2$, 113c'$_2$ of delivery tube 113' when such ends are in retracted position. Transfer tubes 212, 213 have outer ends 212a, 213a that will mate with flared ends 113b'$_2$, 113c'$_2$ when such flared ends are in extended position.

Transfer tubes 212, 213 have mounted therein respective gate valves 214, 215 closely adjacent the ends 212a, 213a. Gate valves 214, 215 include housings 216, 217 having cavities 218, 219 therein which communicate with the interior of transfer tubes 212, 213. Respective pairs of gate members 220a, 220b and 221a, 221b are mounted for sliding movement toward and away from each other. Gate members 220a, 220b and 221a, 221b cooperatively define, when moved into contiguous relation, respective slots 222, 223 therebetween. Gate members 220a, 220b and 221a, 221b are moved by respective pairs of double-acting cylinders 224a, 224b and 225a, 225b that are connected to the gate members by the piston rods thereof.

A pair of hosiery blank grasping and transporting means 151' and 152' are moved by rodless cylinders 157', 158'. Means 151', 152' include finger members 164', 165' and 166', 167' that are movable between closed and open positions in the manner previously described.

Cylinders 157', 158' are mounted on tracks 230, 231 for movement parallel to transfer tubes 212, 213 and toward and away from transfer tubes 212, 213. Reversible motors 232, 233 drive lead screws 234, 235 that are threadably received in carriages 236, 237 that mount cylinders 157', 158' on tracks 230, 231. Movement of the cylinders 157', 158' toward transfer tubes 212, 213 moves finger members 164', 165' and 166', 167' into operative position with respect to the ends 212a, 213a for grasping the welt portions of hosiery blanks therein.

To assist in the grasping of the welt portions of the hosiery blanks by finger members 164', 165' and 166', 167', there are provided suction means on opposite sides of transfer tubes 212, 213. These suction means included respective pairs of suction tubes 240, 241 and 242, 243 connected in a manner not shown to vacuum pump 101 and having flattened end portions 240a, 241a and 242a, 243a defining suction nozzles. The suction nozzles 240a, 242a and 241a, 243a are mounted on members 244, 245 which are connected to piston rods 246, 247 of cylinders (not shown). The nozzles 240a, 242a and 241a, 243a are thereby moved toward and away from the ends 212a, 213a of transfer tubes 212, 213.

A controller means 250 is provided for controlling all of the various functions of the apparatus. Controller means 250 is preferably a microprocessor and its functions will be described hereinafter.

Referring now to FIGS. 20, 21, 22A, 22B and 22C, there is illustrated a still further embodiment of the transfer means and in which like reference characters with the double prime notation are used to designate like parts. The transfer means in these figures is generally indicated at 150" and includes a delivery tube 113" which terminates in bifurcated end portions 113b", 113c". A hosiery blank return tube 125" is connected at one end 125a" thereof to delivery tube 113" and has a gate valve 128" therein.

A branch portion 251 is provided on delivery tube 113" just prior to the bifurcation thereof for admitting air into the bifurcated end portions 113b" and 113c". A gate valve 252 is mounted in branch portion 251 to open and close the branch portion and to control the flow of air therethrough.

Delivery tube 113" has a gate valve 253 therein upstream of the branch portion 251 and spaced from the ends of the bifurcated end portions 113b" and 113c" a distance less than the length of a hosiery blank. Gate valve 253 is controlled by a hosiery blank sensor 132" mounted adjacent the gate valve 253. Accordingly, when a hosiery blank is delivered to a bifurcated end portion 113b" or 113c", sensor 132" senses the arrival thereof and gate valve 253 is closed, the gate therein will clamp the trailing end portion of the hosiery blank in much the same manner as does gate valve 106.

In positioning the hosiery blanks for transfer, it is preferred that the blanks be centered in the bifurcated end portions 113b" and 113c". Accordingly, reduced diameter or neck portions 254, 255 are provided in the bifurcated end portions 113b" and 113c", respectively.

The transfer means 150" is particularly suitable for association with certain existing hosiery blank processing machines, such as the Takatori Line Closing Machine or the Takatori Gusset Line Closing Machine which receive two hosiery blanks, cut the blanks and seam the cut edges together to form the panty portion of a pantyhose. For best results, the hosiery blanks are presented to such line closing machines welt first and with the end portion of the welt folded back upon the blank.

Transfer means 150" includes means 260, 270 operatively associated with bifurcated end portions 113b" and 113c" for positioning hosiery blanks and for folding back the ends of the welts. Positioning means 260, 270 include inner tubes 261, 271 and outer tubes 262, 272, respectively. Collars 263, 273 are positioned at one end of the tubes 261, 262 and 271, 272 and mount the respective tubes 261, 262, and 271, 272 in concentric, spaced relation to each other and in concentric, spaced and sliding relation to the bifurcated end portions 113b" and 113c".

The inner tubes 261, 271 are of slightly larger diameter than the bifurcated end portions 113b" and 113c" and outer tubes 262, 272 are of a larger diameter than inner tubes 261, 271. A plurality of circumferentially spaced-apart spacers 264, 274 are provided between the inner tubes 261, 271 and the outer tubes 262, 272 spaced from the ends of the tubes opposite the collars 263, 273 a predetermined distance corresponding to the amount of the welt end portions to be folded back. Spacers 264, 274 maintain open air passageways defined by the spaces between the inner tubes 261, 271 and the outer tubes 262, 272.

Suction tubes 105b", 105c" are connected at one end thereof to the spaces between the inner tubes 261, 271 and the outer tubes 262, 272 and at the other ends thereof to a suction tube (not shown). Butterfly valves 122", 123" are mounted in suction tubes 105b", 105c", respectively, and control the drawing of a vacuum or suction on the air passageways between the inner tubes 261, 271 and the outer tubes 262, 272.

The outer tubes 262 and 272 have closure means 265, 275 at the ends thereof opposite the collars 263, 273 and adjacent the free ends of the bifurcated end portions 113b", 113c". Closure means 265, 275 include end cap members 266, 276 pivotally mounted on brackets 267, 277, which are in turn mounted on the outer tubes 262, 272, by pivot pins 268, 278 (FIGS. 22A, 22B and 22C). The end cap members 266, 276 have generally L-shaped levers 269, 279 mounted thereon through which the pivot pins 268, 278 penetrate. Double acting air cylinders 280, 290 are connected to the outer tubes 262, 272 at one end and have the piston rods 280a, 290a thereof connected to the levers 269, 279 for moving the end cap members 266, 276 between open and closed positions.

The inner and outer tubes 261, 262 and 271, 272 are mounted for sliding movement relative to the bifurcated end portions 113b", 113c" by the collars 263, 273 and by translating means 281, 291. Translating means 281, 291 include mounting plates 282, 292 attached to outer tubes 262, 272 by pairs of U-bolts 283, 293. Elongate internally threaded members 284, 294 are mounted on plates 282, 292 and have externally threaded rotary shafts 285, 295 therethrough. Shafts 285, 295 are mounted for rotation in bearings 286, 296 carried by base plates 287, 297. Shafts 285, 295 are rotated by gears 288, 298 and by reversible motors 289, 299.

Sensing means 300, 301 are mounted on the outer tubes 262, 272 adjacent the free ends thereof. The sensing means 300, 301 sense when the welt end portions of hosiery blanks are turned back around the free ends of bifurcated end portion 113b" or 113c" and through controller 250 close the valve 122" or 123" and initiate retraction of the inner and outer tubes 261, 262 or 271, 272.

The transfer means 150" is particularly adapted to position and present pantyhose blanks for transfer to a line closer (panty seaming) or toe closer machine. One example of such a machine is the Takatori line closer machine. The Takatori line closer machine is used with a Takatori Auto Loader which includes hosiery gripping fingers 305 mounted for reciprocation (FIGS. 20 and 22C). When inserted into the outer end of one of the bifurcated end portions 113b" or 113c", the fingers 305 are spread apart to grip the welt portion of the hosiery blank. The fingers 305 are then withdrawn and withdraw the pantyhose blank with them.

The operation of the apparatus and the method of the present invention will now be described. A mass of hosiery blanks is delivered to and placed or dumped into the tub 26 of the hosiery blank supply 20. The hosiery blanks in tub 26 will then be in a mass of randomly arranged blanks. The apparatus may include two such hosiery blank supplies 20 as illustrated in FIG. 1, necessitating that both of the hosiery blank supplies be filled with hosiery blanks. The operation of the apparatus is then commenced by activating the controller 250 through suitable controls included therein.

Once the operation of the apparatus is initiated, the hosiery blank removing and transfer means 40 is activated by the controller 250 to cause the clamping means 62 to be lowered by the chain and sprocket assembly and the drive motor 51 into position within the tub 26 of the hosiery blank supply 20. The sensing means 68 mounted on the clamping means 62 will sense the level of the mass of hosiery blanks within the tub 26 and will signal that sensed level to the controller 250, which will control the degree to which the clamping means 62 is lowered with respect to the tub 26. Once the clamping finger 63 and 64 near the level of the mass of hosiery blanks in tub 26, the controller 250 will cause the cylinder 65 to open the finger 63 and 64 until the sensing means 68 signals that the fingers are in contact with the top of the mass of hosiery blanks. At that time, the controller 250 will cause the cylinder 65 to close the clamping fingers 63 and 64 and will then cause the motor 51 to raise the clamping means 62 upwardly to the upper position thereof. During such upward movement, the controller 250 will cause the motor 58 and gear box 57 to rotate the clamping means 62 to a position overlying the funnel 77 on turntable 75. When the clamping means 62 reaches a height and is positioned above the funnel 77, the controller 250 will cause the clamping means 62 to open, and the hosiery blank or blanks removed from the hosiery blank supply 20 will be dropped into the funnel 77.

While it is preferred that the clamping means 62 remove only individual blanks from the supply means 20, it is recognized that frequently the clamping means 62 will clamp and remove more than one hosiery blank. The number of hosiery blanks removed from supply means 20 by the clamping means 62 will usually be from one to four such blanks.

Prior to the clamping means 62 being opened, the sensing means 79 will sense whether or not the compartment 76, which is immediately below the open bottom end of funnel 77, has a hosiery blank or blanks in it at a level to be grasped by the second blank removing and transfer means 80. If the compartment 76 is empty or has a blank or blanks therein, but which are not at the correct level, the sensing means 79 will signal the controller 250 and the controller will open the clamping means 62 and drop the hosiery blank or blanks through the funnel 77 into that compartment 76. If the sensing means 79 senses a hosiery blank or blanks within the compartment 76 under funnel 77 at the correct level, the sensing means 79 will signal that back to the controller 250 which will activate motor 74 to index turntable 75 until an empty or only partially full compartment 76 is positioned beneath the funnel 77. When sensing means 79 senses an empty or only partially full compartment 76 at that location, then the controller 250 will open the clamping means 62 and drop a blank or blanks into that compartment.

This cyclic operation of the hosiery blank removing and transfer means 40 is repeated in timed relation to the operation of the other components of the apparatus. At the same time, the motor 23 is operated by the controller 250 to rotate the tub 26 to insure that the clamping means 62 removes all of the hosiery blanks from the tub 26 and not just a portion of those blanks.

Once the particular compartment 76 receives a hosiery blank or blanks from the clamping means 62, the turntable 75 is indexed by the motor 74 under the control of controller 250 to bring a compartment 76 having a hosiery blank or blanks therein into position beneath the second hosiery blank removing and transfer means 80. At that time, controller 250 activates the cylinder 83 to lower the clamping and unclamping means 86 downwardly through the hole 97 in the supporting table 96 through the transfer member 98 and into the compartment 76 located therebeneath. The sensing means 93 senses when the clamping members 87 and 88 are in correct position with respect to the hosiery blank or blanks in the compartment 76 and signals the controller 250. Controller 250 removes the air pressure from the cylinder 91b permitting the spring 93 to close the scissors clamping members 87 and 88 and to clamp a hosiery blank within the compartment. The controller 250 then causes the cylinder 83 to raise the clamping means 86 upwardly through the transfer member 98 and the hole 97 in the supporting table 96. Once the trailing end of the clamped hosiery blank clears or reaches the medial portion 98a of the hosiery transfer member, the sensing means 99 will sense the passage of the trailing end of the hosiery blank past the sensing means 99 and will signal that fact to the controller 250. Controller 250 will then stop the upward travel of clamping means 86, will apply suction to the end portion 103a of the hosiery blank conveying tube 103, and will cause the clamping means 86 to open and the hosiery blank to be released.

In the unlikely and unusual event that clamping means 86 clamps and removes more than a single hosiery blank from the compartment 76, it is very unlikely that the hosiery blanks so removed will be clamped at the same point along their length. Therefore, the trailing end of one blank will be at a lower position than the trailing end or ends of the other or others. Only the very last trailing end will be drawn into tube 103 and the other blank or blanks will fall back into compartment 76 when released.

To apply suction to end portion 103a, controller 250 will open the gate valve 110, flapper valve 112 and gate valves 111 106 to permit the vacuum fan 101 to draw a vacuum on the hosiery blank conveying tube 103 which is connected to the transfer member 98. The trailing end of the hosiery blank that is clamped by the clamping means 86 will thus be drawn into the end portion 103a of tube 103 slightly prior to the hosiery blank being released by the clamping means 86. The hosiery blank will then pass along the tube 103 until the same passes the sensing means 140 which is mounted around tube 103 immediately downstream of the gate valve 110. The arrival of the leading end portion of the hosiery blank at the sensing means 140 will be signalled to the controller 250, which will then close the flapper valve 111 such that the flapper member 111a thereof will close the opening through the valve 111 except for the small diameter hole 111b in member 111a. This will reduce the suction in tube 103 to slow down the speed of travel of the hosiery blank.

The screen 104 will stop the forward travel of the hosiery blank once the forward end thereof reaches that position. At the same time, the sensing means 130 senses the presence of the hosiery blank at that position and signals that fact to the controller 250. The controller 250 then causes cylinder 109b to close the gate 108 of gate valve 106 to clamp the end portion of the hosiery blank within the gate valve 106. Simultaneously, the controller 250 causes the flapper valve 112 to close to remove the suction from tube 103.

Because the suction or vacuum on tube 103 may have caused the hosiery blank to bunch up within the tube 103 against the gate valve 106, the controller causes the gate valves 115, 116, 120 and 121 and flapper valves 122, 123 and 124 to open so that a suction or vacuum is drawn on delivery tube 113 and a reverse suction is drawn on tube 103. Simultaneously, gate valve 117 is closed and gate valve 113 is opened so that air is drawn from branch 114c into tube 103 to extend the clamped hosiery blank substantially to its full length back along tube 103 and into end portion 113a of delivery tube 113. If the hosiery blank is clamped substantially at one end thereof, the same may be extended to its full length and the end opposite the clamped end will pass the sensing means 131. When sensing means 131 senses the hosiery blank, controller 250 causes gate valve 115 to close to clamp the other end portion of the hosiery blank. Sensing means 130 will then sense the thickness of the clamped end portion of the hosiery blank.

If the hosiery blank is folded or clamped at an intermediate point along its length and cannot be extended sufficiently to reach the sensing means 131, the hosiery blank will be returned to the turntable 75 to be picked up and reintroduced to another orientation means. In this regard, when the sensing means 99 causes a hosiery blank to be introduced into orientation means 100, a timing cycle of preferably three (3) seconds is instituted. If sensing means 131 is not actuated in three seconds, valves 116, 120 and 121 are closed and valves 117 and 128 are opened and gate valve 106 is opened to unclamp or release the hosiery blank. Suction will then draw the hosiery blank through second delivery tube 114, a portion of tube 113 and return tube 125 to bell end portion 125b. The hosiery blank will then drop into a compartment 76 on turntable 75.

If the thickness characteristic sensed by the sensing means 130 indicates that it is the toe end portion of a hosiery blank that is clamped by the gate valve 106 and it is desired that the hosiery blank be delivered to the automated transfer means 150 welt end first, the controller 250 will open the gate valves 115, 116 and one of the valves 120 or 121 and will close the gate valve 117 before opening the gate valve 106 to release the clamped hosiery blank. The hosiery blank will then be free to pass out of the tube 103 into the tube 113 and along tube 113 into one of the bifurcated end portions 113b or 113c until it reaches the transfer means 150. If, however, the sensing means 130 senses a characteristic indicative of the welt end portion being clamped by gate valve 106 and it is desired to deliver the hosiery blank to the transfer point welt end first, then the gate valve 116 will be closed and gate valve 117 will be opened prior to opening gate valves 106 and 115 to release the hosiery blank. Thereupon, the hosiery blank will pass into end portion 114a of tube 114 through the tube 114 into tube 113 and therealong into one of the bifurcated end portions 113b or 113c. Obviously, if it is desired to deliver the hosiery blank toe end first to the transfer point, the foregoing procedure will be reversed.

Once a hosiery blank has traveled along delivery tube 113 and is sensed by the sensing means 132, the controller 250 will cause the flapper valve 122 or 123 to close to reduce the suction force being applied to slow down the rate of travel of the hosiery blank as it approaches the transfer means. Once the hosiery blank reaches the transfer means and another hosiery blank is on its way, the other flapper valve will be closed in similar manner until a pair of hosiery blanks are in position for transfer.

Upon arrival of a pair of hosiery blanks in bifurcated end portions 113b and 113c, one of the alternative embodiments of the automated transfer means 150 will be in place and will be activated. The embodiment shown in FIGS. 11–15 will now be described as operated in accordance with the present invention. The grasping means 151 and 152 will have been previously lowered to a position where the collapsed grasping finger members 164, 165 and 166, 167 are disposed within the delivery tube end portions. The welt portions of the hosiery blanks are then grasped by the depending finger portions 164b, 165b and 166b, 167b being spread apart and the means 151 and 152 are raised upwardly by the cylinders 157 and 158.

As the hosiery blanks are raised upwardly out of the bifurcated end portions of the delivery tube 113, the suction on the delivery tube 113 is cut off by closure of the gate valves 120, 121 and 124. As the means 151 and 152 approach the transfer members 180, 181, the finger members 164, 165 and 166, 167 pass on opposite sides of the transfer members 180 and 181. The transfer members 180 and 181 thus enter the open welt portions of the hosiery blanks, which continue to be raised upwardly until the upper ends of the hosiery blanks engage the stops on the transfer members 180, 181. Further upward movement of the means 151 and 152 strip the hosiery blank welt portions from the finger members 164, 165 and 166, 167 and the welt portions then contract onto and are held in place on the transfer members 180 and 181.

When the means 151 and 152 clear the transfer members 180 and 181, the controller 250 activates the cylinder 185 to move the transfer members 180 and 181 therealong to the point where the hosiery blanks are to be transferred to the blank processing means 200. At that point, the transfer means 186 is activated and the cylinder 188 moves the finger members 193 and 194 between the portions 180a, 180b and 181a, 181b of transfer members 180, 181 to position these fingers above the welt portions of the hosiery blanks. When the fingers are in position, the cylinder 189 is activated to lower the fingers 193, 194 and carriage downwardly while the cylinder 198 is activated to cause the fingers 193, 194 to pivot outwardly to firmly grasp and spread the welt portions of the hosiery blanks.

Further downward movement of the finger members 193, 194 strips the hosiery blanks from the transfer members 180 and 181. The cylinder 188 is then activated to move the transfer means 186 into the blank processing means 200 for processing either to form the panty portion of the pantyhose or to close the toe portions thereof or both.

In the embodiment illustrated in FIGS. 16–19E, the hosiery blanks must be delivered to the transfer point toe end first rather than welt end first as with the prior embodiment. Once the hosiery blanks reach the bifurcated end portions of delivery tube 113', controller 250 activates the cylinders 210 and 211 to extend the end portions 113b'$_2$ and 113c'$_2$ into engagement with the end portions 212a and 213a of transfer tubes 212 and 213. Simultaneously, vacuum is applied to the transfer tubes 212 and 213 and the gate valves 214 and 215 are closed.

The hosiery blanks are drawn into the transfer tube 212 and 213 by the vacuum therein through the slots 222 and 223 in gate valves 214 and 215 as is illustrated in FIGS. 19A–19C. Because the welt portions of the hosiery blanks are thicker than the remainder of the hosiery blanks, the welt portions will not be permitted to pass through the slots 222 and 223 and therefore the hosiery blanks will be held in the tubes 212 and 223 with the welt portions being held by the gate members 220a, 220b and 221a, 221b.

The end portions of the delivery tube 113' will then be retracted by reversing the cylinders 210 and 211 to expose the end portions 212a and 213a to the hosiery blank grasping and transfer means 151' and 152'. The cylinders 157' and 158' are activated by controller 250 to lower the means 151' and 152' into position adjacent the transfer tubes 212 and 213. The grasping finger members 164', 165' and 166', 167' enter the welt portions of the hosiery blanks which have been spread by the suction nozzles 240a, 241a and 242a, 243a. The suction nozzles 240a, 242a and 241a, 243a are retracted and the finger members 164', 165' and 166', 167' are spread apart.

The suction is removed from transfer tubes 212, 213 and the grasping means 151', 152' are moved upwardly to transfer the welt portions of the pair of hosiery blanks to transfer members or another form of transfer means.

In the embodiment of the transfer means illustrated in FIGS. 20–22C, the hosiery blanks must be delivered to the transfer means 150" welt end first. The hosiery blank will be sensed by the sensing means 132" which will cause the controller 250 to actuate the gate valve 253 to close the delivery tube 113" and clamp the trailing foot end of the hosiery blank. At the same time, the gate valve 252 is actuated to open the branch tube 251 to admit atmospheric air into the bifurcated end portions 113b", 113c" and the valve 122" or 123", corresponding to the end portion 113b" or 113c" in which the hosiery blank is received, is opened to connect that end portion to the source of suction.

As shown in FIG. 22A, the welt end of the hosiery blank protrudes through the terminal end of the end portion 113b"0 of delivery tube 113" and engages the end cap 266. The end caps 266, 276 have a bulbous inner surface 266a, 276a which the welt ends of the hosiery blanks engage. The bulbous portion 266a or 276a will partially enter the welt end and position the welt end portion to be turned or folded back.

With the hosiery blank clamped by the gate valve 253 and valve 122" open, suction in the space between the outer tube 262 and the inner tube 261 will fold the welt end portion of the hosiery blank back over the terminal end of the inner tube 261 until the terminal end of the welt portion abuts the spacers 264. The sensing means 300 will sense the presence of the folded back end portion of the welt end of the hosiery blank and will cause the controller 250 to close the valve 122" thereby discontinuing the suction. At the same time, the end cap 265 is opened by actuating the cylinder-piston means 280. Also, the motor 289 is energized to retract the inner and outer tubes 261, 262 to expose the free end of the delivery tube end portion 113b". The gripping fingers 305 are advanced to enter the turned or folded back welt end portion and expanded to grip the welt end of the hosiery blank. The motor 289 is energized to extend the inner and outer tubes 261, 262 and the inner tube engages the folded back end portion of the welt of the hosiery blank gripped by the gripper fingers 305 and unfolds or returns the end portion of the welt to its original, unfolded position. The gate valve 253 is then opened to release the hosiery blank, which is then withdrawn by the gripping fingers 305.

Once the hosiery blank is withdrawn, the end cap 265 is closed. Simultaneously, the other end portion 113c" of delivery tube 113" is receiving a hosiery blank and the foregoing operation is repeated.

In the drawings and specification there has been set forth a preferred embodiment of the invention, and although specific terms are employed, they are used in a generic and descriptive sense only and not for purposes of limitation.

That which is claimed is:

1. Apparatus for handling and orienting circular knit hosiery blanks for further processing, said apparatus comprising support means for supporting the hosiery blanks in spaced apart relation, first means for removing a small number of hosiery blanks from a mass of randomly arranged blanks and for depositing the same on said support means in spaced relation to previously deposited hosiery blanks, second means for removing individual hosiery blanks from said support means and for transporting the same along a predetermined path of travel, orientation means for receiving individual hosiery blanks from said blank transporting means, orienting the blanks in a predetermined orientation and delivering the properly oriented blanks for further processing, said orientation means comprises first conveying means for conveying individual hosiery blanks, one at a time, to a sensing station, sensing means at the sensing station for sensing the thickness of the portion of the hosiery blank beneath said sensing means to indicate the particular orientation of that hosiery blank at that time, and second conveying means for conveying the hosiery blank, welt end first, along one of two alternate paths of travel depending on the sensed orientation of the blank, means for further processing hosiery blanks, and transfer means for transferring hosiery blanks from said second conveying means to said further processing means, said transfer means comprising means for clamping the hosiery blanks in spaced relation to the termination of said second conveying means with the welt end thereof protruding a predetermined distance from said second conveying means, means for turning or folding back the protruding portion of the welt end of the hosiery blank, and gripping finger means for entering the turned-back welt end portion and for gripping the welt end portion of the hosiery blank to withdraw the hosiery blank from said second conveying means and to transfer the hosiery blank to said further processing means.

2. Apparatus according to claim 1 wherein said second conveying means includes a delivery tube through which hosiery blanks are delivered, said delivery tube terminating in at least one free end portion, said clamping means being operatively associated with said delivery tube and spaced from the free end thereof a distance less than the length of a hosiery blank.

3. Apparatus according to claim 2 wherein said means for turning or folding back the welt end portion of the hosiery blank comprises an outer tube surrounding the free end portion of said delivery tube and being of an internal diameter sufficiently larger than the external diameter of said delivery tube to define a suction chamber between said outer tube and said delivery tube, said outer tube extending outwardly beyond the terminal end of said delivery tube and having an end cap mounted for pivotal movement between a closed position in which said end cap closes the outer end of said outer tube and an open position in which the end cap is spaced from the outer end of said outer tube, means mounting said outer tube for longitudinal sliding movement relative to said delivery tube between an extended position in which said outer tube surrounds the terminal end portion of said delivery tube and a retracted position in which the terminal end portion of said delivery tube protrudes through the open outer end of said outer tube for transfer of a hosiery blank, and suction means connected to said outer tube for drawing a suction on the suction chamber in said outer tube when said end cap is in the closed position and said outer tube is in the extended position to turn or fold back over the terminal end of said delivery tube the protruding welt portion of the hosiery blank.

4. Apparatus according to claim 2 wherein said means for turning or folding back the welt end portion of the hosiery blank further includes an intermediate tube mounted within said outer tube between said outer tube and said delivery tube end portion, said intermediate tube being mounted for movement with said outer tube and having a terminal end spaced a predetermined distance inwardly of the terminal end of said outer tube and said end cap, said suction air chamber being defined by the space between said outer tube and said intermediate tube so that the welt end portion of the hosiery blank is folded back over the terminal end of said intermediate tube until said outer tube and said intermediate tube are moved to the retracted position, said intermediate tube engaging the folded back welt end portion on said gripper fingers upon movement of said outer and intermediate tubes to the extended position to unfold the welt end portion on said gripper fingers.

* * * * *

UNITED STATES PATENT AND TRADEMARK OFFICE
CERTIFICATE OF CORRECTION

PATENT NO. :  5,544,603

DATED :  August 13, 1996

INVENTOR(S) :  Cecil R. Bell et al.

It is certified that error appears in the above-identified patent and that said Letters Patent is hereby corrected as shown below:

On the cover page, Column 1, Related U.S. Application Data, after "Apr. 5, 1994" insert -- , U.S. Patent No. 5,511,501 --;

Column 1, line 7, after "Apr. 5, 1994" insert -- , now U.S. Patent No. 5,511,501 --;

Column 1, line 64, "pickup" should be -- pick-up --;

Column 6, line 29, "pick-up" should be -- pick up --;

Column 8, line 8, "101" should be -- 101a --;

Column 10, line 7, "finger" should be -- fingers --;

Column 11, line 17, "128"" should be -- 128 --;

Column 13, lines 6 and 8, "finger" should be -- fingers --;

Column 14, line 27, "flapper valve 112" should be -- flapper valves 111, 112 --;

Column 14, line 27, "gate valves" should be -- gate valve --;

UNITED STATES PATENT AND TRADEMARK OFFICE
CERTIFICATE OF CORRECTION

PATENT NO. :     5,544,603
DATED      :     August 13, 1996
INVENTOR(S) :    Cecil R. Bell et al.

It is certified that error appears in the above-identified patent and that said Letters Patent is hereby corrected as shown below:

Column 14, line 28, delete "111";

Column 14, line 60, "113" should be -- 118 --;

Column 16, line 52, "223" should be -- 213 --;

Column 17, line 16, at the end of the line, delete "O";

Column 17, line 67, "orionting" should be -- orienting --.

Signed and Sealed this

Twenty-first Day of January, 1997

Attest:

BRUCE LEHMAN

Attesting Officer       Commissioner of Patents and Trademarks